United States Patent
Watanabe et al.

[11] Patent Number: 5,816,506
[45] Date of Patent: Oct. 6, 1998

[54] NOZZLE AND NOZZLE PROCESSING METHOD

[75] Inventors: Masaru Watanabe, Nishinomiya; Hiroshi Maruyama, Joyo; Kimihiro Nakano, Osaka, all of Japan

[73] Assignee: Matsushita Electric Industrial Co., Ltd., Osaka, Japan

[21] Appl. No.: 650,454

[22] Filed: May 20, 1996

[30] Foreign Application Priority Data

| May 24, 1995 | [JP] | Japan | 7-124743 |
|---|---|---|---|
| May 18, 1995 | [JP] | Japan | 7-119691 |
| Nov. 17, 1995 | [JP] | Japan | 7-299380 |
| Feb. 8, 1996 | [JP] | Japan | 8-022202 |

[51] Int. Cl.$^6$ ............................. B05B 1/02; B05B 1/14
[52] U.S. Cl. .......................... 239/568; 239/597; 118/410
[58] Field of Search ..................... 239/597, 568; 427/356–358, 371, 331; 118/410, 411, 419

[56] References Cited

U.S. PATENT DOCUMENTS

| 4,537,801 | 8/1985 | Takeda . | |
|---|---|---|---|
| 4,854,262 | 8/1989 | Chino et al. | 427/356 X |
| 5,105,760 | 4/1992 | Takahashi et al. | 427/356 X |
| 5,173,119 | 12/1992 | Watanabe et al. . | |
| 5,384,162 | 1/1995 | Takahashi et al. | 427/356 |
| 5,534,065 | 7/1996 | Masukawa et al. | 118/410 |
| 5,569,494 | 10/1996 | Suzuki et al. | 427/358 |

FOREIGN PATENT DOCUMENTS

| 457029 | 11/1991 | European Pat. Off. . |
|---|---|---|
| 539724 | 5/1993 | European Pat. Off. . |
| 2312176 | 12/1976 | France . |
| 2854023 | 7/1980 | Germany . |
| 2035959 | 2/1990 | Japan . |
| 3032768 | 2/1991 | Japan . |
| 3121765 | 5/1991 | Japan . |
| 4022469 | 1/1992 | Japan . |

OTHER PUBLICATIONS

*Patent Abstracts of Japan*, vol. 14, No. 192 (C–711), 19 Apr. 1990 & JP–A–02 035959 (Fuji Photo Film Co Ltd), 6 Feb. 1990.

*Patent Abstracts of Japan*, vol. 15, No. 321 (M–1147), 15 Aug. 1991 & JP–A–03 121765 (Mitsubishi Materials Corp), 23 May 1991.

*Primary Examiner*—Lesley D. Morris
*Attorney, Agent, or Firm*—Beveridge, DeGrandi, Weilacher & Young, LLP

[57] ABSTRACT

A nozzle and processing method thereof which provides suppression of vertical stripes due to foreign matter or aggregates in the paint or dust deposits on the base material. In one embodiment of the present invention the nozzle includes an upstream lip, a downstream lip in a curvature shape projecting to the base material side, and a slit formed by the upstream lip and downstream lip. A side edge of the downstream lip is formed in a curvature shape having a radius of a curvature in a range of 4 to 45 $\mu$m, and by this edge, even a paint of high viscosity which hardly flows can smoothly flow into the gap between the downstream lip and base material. Aggregates in the paint or dust deposits on the base material therefore are not caught in the edge.

16 Claims, 21 Drawing Sheets

PRIOR ART

PRIOR ART

PRIOR ART

PRIOR ART

NOZZLE AND NOZZLE PROCESSING METHOD

BACKGROUND OF THE INVENTION

1. Field of the Invention

The present invention relates to a nozzle used in an application device for applying and forming ceramic sheet or the like used in electronic components field including magnetic tape, floppy disk, photosensitive film, silicone coating, battery pole plate, laminate ceramic capacitor, laminate varistor, and laminate piezoelectric element, and processing method of nozzle.

2. Related Art of the Invention

As an example of technique for applying and forming various paste, slurry or liquid on base material, a nozzle of magnetic tape is explained. As a nozzle for magnetic tape or the like, the present inventor proposed a nozzle for applying and forming a coat film of magnetic layer or the like in a single layer in Japanese Laid-open Patent 3-32768. This nozzle is composed of an upstream lip and a downstream lip of specific shape, in which a paint is applied and formed on the downstream lip of curvature shape, while lifting the base material by the paint, without supporting the back side of the base material, so that products such as magnetic tapes with a uniform and smooth coat film thickness can be produced. Moreover, along with the recent trend of higher density recording of magnetic tape, to meet the need of forming magnetic layer in multiple layers, a nozzle for applying and forming two layers simultaneously was proposed in Japanese Laid-open Patent 4-22469. This nozzle comprises a second lip and a third lip of a specific shape, and two slits, so that magnetic tapes of two-layer structure can be applied and formed smoothly in a uniform film thickness.

FIG. 14 shows an example of nozzle for use in applying a paint on various sheets. In FIG. 14, a nozzle 21 consists of two members, and these two members are fixed by plural bolts 22. In the nozzle 21, a manifold 23 of a circular section extending in the longitudinal direction is formed and slit 24 is formed above the manifold 23. Further, at the front end of the nozzle 21, an upstream lip 25 and a downstream lip 26 of a slender thin plate projecting by a specific length are formed. After placing the nozzle 21 in the application apparatus, as shown in FIG. 15, a paint 27 supplied in the manifold 23 is extruded from a slit 24 to flow into the gap between the downstream lip 26 and a sheet 28, and the paint 27 is uniformly applied on the sheet 28. In this type of nozzle, as shown in FIG. 16, a slit exit side edge 29 of the downstream lip 26 has a sharp edge, and it was known that aggregates of magnetic particles in the paint, external dust and foreign matter are likely to be caught in the top of the sharp edge to cause uneven streaks. As means of solving this problem, Japanese Laid-open Patent 2-35959 is disclosed.

Moreover, as the magnetic recording medium is becoming higher in performance, recently, a multi-layer structure of magnetic layer is drawing attention. For example, by forming a magnetic layer excellent in electromagnetic conversion characteristic in high frequency range for high density recording as an upper layer, and forming a magnetic layer having an electromagnetic conversion characteristic in a lower frequency range than in the upper layer as a lower layer, an excellent electromagnetic characteristic never obtained in the conventional single layer can be obtained. The multi-layer structure of magnetic recording medium is further promoted, for example, by placing an anchor layer between a magnetic layer and a support element composed of plastic film.

The magnetic recording medium of such multi-layer structure is desired to be manufactured by a single step of application and drying, which requires a nozzle having two slits capable of applying two kinds of paint in two layers simultaneously.

FIG. 21 is a schematic diagram showing an example thereof. The nozzle consists of blocks 101, 102 and 103, and a pair of right and left side blocks (not shown), which are mutually fixed by plural bolts 104 penetrating through the blocks. The front end shape of the second block 102 and third block 103 is a curvature shape projecting to the film side. In the middle of the first block 101 and third block 103, semicircular manifolds 105, 106 extending in the width direction are formed. Among the blocks, a first slit 107 and a second slit 108 connected to the manifolds 105 and 106 are formed.

This nozzle is placed in an application apparatus, and, as shown in FIG. 22, paints 118, 119 supplied in the manifolds 105, 106 are uniformly applied on a film 117 running at a specific speed.

As the technique for processing this type of nozzle, for example, a method disclosed in Japanese Laid-open Patent 3-121765 has been known hitherto.

However, when application job is done continuously for a long time with the conventional nozzle, aggregates in the magnetic paint (hereinafter called paint) and foreign matter, and fine dust particles depositing on the film which is the base material on which the paint is applied are caught in the edge at the slit exit side of the downstream lip, and vertical stripes are formed, which was a fatal defect for the product quality. To solve this problem, a nozzle forming a flat part in a width range of 0.01 to 1 mm at the edge of the slit exit side of the downstream lip has been proposed in Japanese Laid-open Patent 2-35959. Yet, since the boundary of the flat part and the slit and the downstream lip surface is an edge, and similar aggregates, foreign matter and dust were caught in the edge of the boundary, vertical stripes were formed.

Moreover, to cope with the recent trend of higher density recording, instead of the hitherto used magnetic iron oxide powder, magnetic iron powder has come to be used mainly for digital recording, in particular, and the particle size of the magnetic iron powder in the paint is further becoming smaller. Accordingly, the mutually attracting force of magnetic powder particles dispersed in the paint is stronger than in the conventional paint, and hence the paint is more likely to aggregate and higher in viscosity. If attempted to apply this hardly flowing paint sparingly and uniformly by using a conventional nozzle, since the slit exit side edge of the downstream lip is a sharp edge, the paint cannot flow uniformly in the width direction into the gap between the downstream lip and the film or the base material, which made it impossible to produce a magnetic tape with a uniform film thickness.

In the magnetic tape with two-layer structure of coating, the upper layer must be formed in a very thin coating thickness of about 0.2 $\mu$m in order to realize high density recording. When the hardly flowing paint which is the recent paint for high density recording mentioned above is applied and formed as the upper layer by using the conventional nozzle disclosed in Japanese Laid-open Patent 4-22469, since the slit side edge of the third lip is a sharp edge, the paint for the upper layer cannot flow uniformly in the width direction into the gap between the third lip and the lower layer already applied and formed on the film which is the base material, and it is impossible to produce a two-layer tape with an upper layer of uniform thickness.

In production of two-layer tape, further, when the nozzle disclosed in Japanese Laid-open Patent 4-22469 is used, in particular if attempted to apply the upper layer thinly and uniformly, an uneven film thickness occurs in the upper layer. This is because, related with the lip processing precision of the nozzle, the step difference between the second slit exit side edge of the second lip and the second slit exit side edge of the third lip varies in a micron order, and the upper layer is applied thickly in the portion of large step difference, whereas the upper layer is applied thinly in the portion of small step difference.

These phenomena are increase of viscosity due to higher concentration of ceramic slurry, for example, and increase of viscosity due to solvent-free silicone coating or higher concentration, and the fluidity of slurry and application liquid is worse than before, and the same problems as mentioned above are caused.

On the other hand, Japanese Laid-open Patent 2-35959 is intended to chamfer a very small plane shape on a sharp edge 29, and ultimately a peak is formed in the boundary of the lip surface 30 and chamfered surface (see FIG. 16), and foreign matter is caught on the peak, and uneven stripes are formed, and hence stable application was difficult. To realize a nozzle capable of applying stably for a long time without causing uneven stripes, it is important not to form a peak in the edge, and it hence necessary to chamfer the curvature shape in a very small area and at high precision in the slit exit side edge of the downstream lip. In the conventional chamfering method, however, only the plane shape chamfering as disclosed in Japanese Laid-open Patent 2-35959 was possible.

Incidentally, in the conventional processing method as disclosed in Japanese Laid-open Patent 3-121765, for example, since the second block 102 and third block 103 are ground and processed separately, as shown in FIG. 23, the step difference between the exit edge 110 at the front end of the second block 102 and the entry edge 111 at the front end of the third block 103 adjacent to each other fluctuated in the width direction. In FIG. 23, meanwhile, the second block and third block are different in shape from the second and third blocks in FIG. 21 and FIG. 22.

According to the study by the present inventors, when the step difference of both edges varies in the width direction, it is known that uneven application occurs obviously in the application width direction.

SUMMARY OF THE INVENTION

It is hence a primary object of the invention to present, in consideration of the above problems of the conventional nozzles, a nozzle and nozzle processing method capable of suppressing occurrence of vertical stripes caused by foreign matter and aggregates in the paint or dust particles on the base material, and thus apply and form layers in a uniform thickness even by using a paint strong in aggregation power and poor in fluidity. It is a further object of the present invention to present a nozzle processing method for chamfering the curvature shape in a very small area and at high precision in the slit side edge of downstream lip of nozzle, and to present a nozzle processing method free from uneven coat film thickness by making the step difference of both edges uniformly in the width direction without fluctuation.

A nozzle formed in accordance with the present invention therefore comprises
 an upstream lip,
 at least one downstream lip having a curvature shape projecting to a base material side from the upstream lip, and
 at least one slit formed by the upstream lip and the at least one downstream lip, wherein
  a slit outlet side corner portion of the at least one downstream lip is an arc or a nearly arc shape with radius of curvature of 5 to 45 μm.

In this constitution, since there is an arc of small radius of curvature in the slit exit side corner of the downstream lip or a corner portion of near arc shape, even the paint that is extremely hard to flow can flow naturally into the gap of the downstream lip and base material, so that a thin and uniform coat film can be obtained. Moreover, aggregates and foreign matter in the paint or dust particles on the base material are not caught in the corner in the process of continuous application, so that occurrence of vertical stripes can be suppressed.

A nozzle in accordance with another embodiment of the present invention comprises
 at least three lips, and
 at least two slits formed by these at least three lips, wherein
  at least two downstream lips except for the upstream lip of the at least three lips have a curvature shape projecting to the base material side, and
  a slit outlet side corner portion of the upstream side of each one of the at least two downstream lips is an arc or a nearly arc shape with radius of curvature of 5 to 45 μm.

In this constitution, for example, since there is a arc of small radius of curvature or a corner of near arc shape in the first slit exit side corner of the second lip and second slit exit side corner of the third lip, if hardly flowing paint is applied to form a magnetic tape in two-layer structure consisting of lower layer and upper layer, both lower layer and upper layer can be formed thinly and uniformly. Moreover, aggregates and foreign matter in the paint or dust particles on the base material are not caught in the corner in the process of continuous application, so that occurrence of vertical stripes can be suppressed.

A nozzle of the present invention comprises
 at least three lips, and
 at least two slits formed by these at least three lips, wherein
  at least two downstream lips except for the upstream lip of the at least three lips have a curvature shape identical in center and identical in radius of curvature.

In this constitution, it is possible to grind, for example, the second lip and third lip simultaneously. It is thus possible to keep the step difference between the second slit exit side edge of the second lip and second slit exit side edge of the third lip uniformly in the width direction. As a result, when the hardly flowing paint is applied as the upper layer to form a magnetic tape in two-layer structure, since the step difference is uniform in the width direction, in particular, the upper layer can be formed thinly and uniformly.

A nozzle of the present invention comprises
 at least three lips, and
 at least two slits formed by these at least three lips, wherein
  at least two downstream lips except for the upstream lip of the at least three lips have a curvature shape of same radius of curvature, and
  the step difference of each edge at the slit side formed by the at least two downstream lips is in a range of 3 to 10 μm.

A processing method of the present invention, of a nozzle comprising at least three lips, and at least two slits formed by these at least three lips, of which at least two downstream lips except for the upstream lip of the at least three lips have a curvature shape identical in center and of same radius of curvature, for assembling by deviating one lip so that the step difference of each edge at the slit side formed by the at least two downstream lips may be in a range of 3 to 10 $\mu$m.

It is hence possible to eliminate fluctuation of step difference of both edges in the width direction.

A processing method of the present invention, of a nozzle comprising steps of grinding an edge at a slit exit side of a downstream lip of the nozzle in at least two steps in a width direction to form a section in a polygonal form, and finishing by lapping to form the polygonal form into a curvature.

Accordingly, it is possible to process precisely in the width direction because the slit exit side edge of the downstream lip of the nozzle is formed in a polygonal form by grinding. Moreover, the grinding amount is extremely small because lap finishing is done while replacing the lapping tape with grain size of #500 to #15000 gradually with one of finer size. Therefore, without sacrificing the precision of polygonal shape, it is possible to chamfer in a smooth surface and small curvature shape at high precision, at radius of curvature of 5 to 45 $\mu$m.

A processing method of the present invention, of a nozzle for forming an edge of a slit exit side of a downstream lip of the nozzle into a curvature by electric discharge cutting.

Hence, a curvature is formed by processing in one step. Besides, same as above, by lap finishing by using the lapping tape with grain size of #500 to #15000, it is possible to chamfer in a smooth surface and small curvature shape at high precision, at radius of curvature of 5 to 45 $\mu$m.

A processing method of the present invention, of a nozzle comprising steps of processing an edge of a slit exit side of a downstream lip of the nozzle by electric discharge cutting or grinding, and lap finishing by a super-burnishing machine.

Hence, the shape of the smooth curvature can be processed uniformly and precisely in the nozzle width direction.

A processing method of the present invention, of a nozzle for processing a front end of the nozzle having at least two blocks, wherein after at least a plurality of adjacent ones of the blocks are coupled, and then the front ends of the coupled blocks simultaneously are ground and processed.

According to this invention, by coupling the blocks and grinding the front ends simultaneously, the step difference of edges of front ends of adjacent blocks is free from fluctuation in the block width direction.

A processing method of the present invention, of a nozzle for processing a front end of the nozzle having at least two blocks, wherein any one block is gripped from both sides in a thickness direction, at least in a front end portion of the nozzle, by a support member, coupling them, and then the front end of the nozzle is ground and processed.

According to this invention, by grinding by gripping the front end of a single block from both sides in the thickness direction by means of a support member, the apparent rigidity of the block can be enhanced, and warp and deflection of block occurring at the time of processing can be eliminated, and the straightness of the edge of the block front end in the width direction is enhanced. In particular, this effect is notable in grinding process of a thin block in a thickness of 2 mm to 10 mm.

A processing method of the present invention, of a nozzle for processing a front end of the nozzle having at least two blocks, wherein at least a plurality of adjacent blocks of the blocks are overlaid, a support member is abutted against at least the front end of the nozzle to the overlaid blocks from the thickness direction side, they are coupled, and the front ends of the nozzle simultaneously are ground and processed.

According to this invention, eliminating warp and deflection occurring in processing, the precision of straightness of the block front end in the width direction is enhanced, and fluctuations of step difference of front ends of adjacent blocks can be suppressed.

[REFERENCE NUMERALS]

Figure 1:
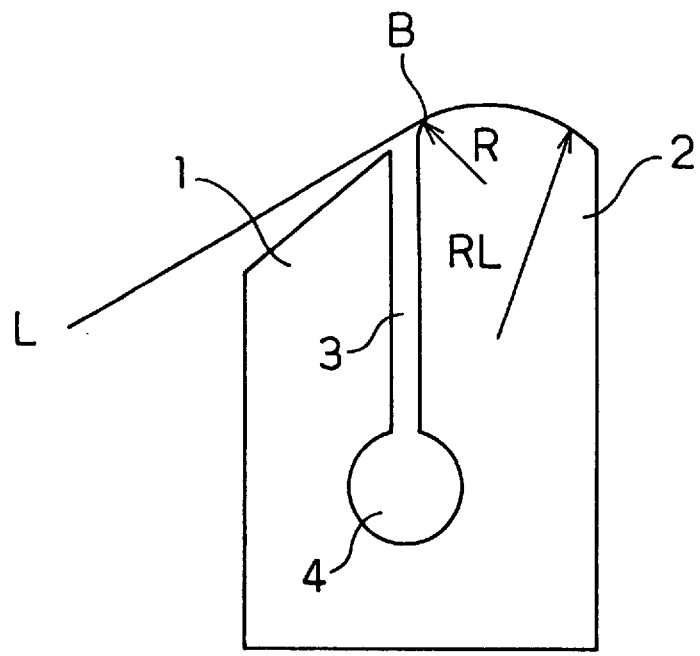
FIG. 1 is a side view of a nozzle in a first embodiment of the invention.

1, 25 Upstream lips
2, 26 Downstream lips
3, 24 Slits
4 Manifold
5 First lip
6 Second lip
7 Third lip
8 First slit
9 Second slit
12 Lower layer
13 Upper layer
15 Base material
16 Coat film
17 Paint
18 Lower layer paint
19 Upper layer paint
21 Nozzle
28 Sheet
29 Sharp edge
31 Lapping tape
101 First block
102 Second block
103 Third block
104 Bolt
105 First manifold
106 Second manifold
107 First slit
108 Second slit
113, 114, 115 Support members
116 Grinding wheel
117 film
118 Lower layer paint
119 Upper layer paint Preferred Embodiments Referring now to the drawings, some of the embodiments of the invention are described in detail below.

(Embodiment 1)

Figure 2:
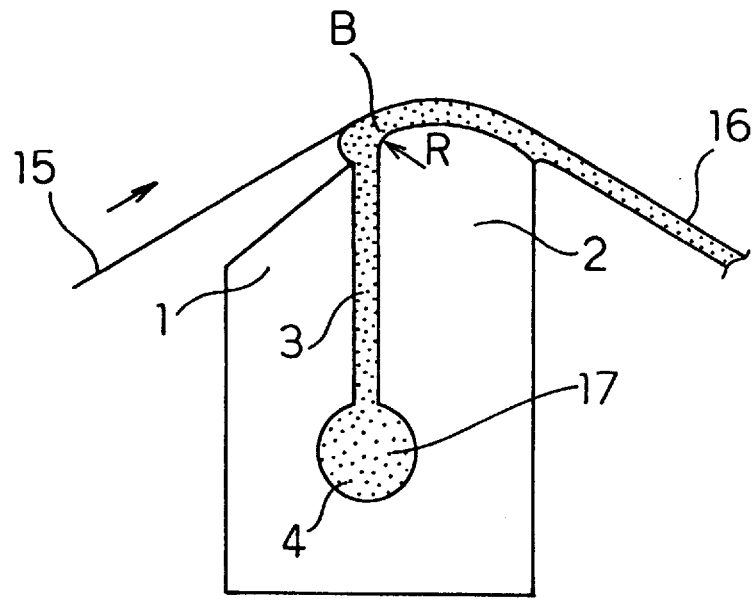
FIG. 2 is a side view of application of paint by the nozzle of the first embodiment.

FIG. 1 is a side view of a nozzle in a first embodiment of the invention. FIG. 2 is a diagram of a nozzle in this embodiment, showing application of paint on a base material 15. In FIG. 2, a paint 17 is supplied in a manifold 4 of a nozzle by feeding means (not shown) such as pump, and is extruded from a slit 3, so as to lift a base material 15 from the nozzle by the paint 17. The paint 17 is applied on base material 15 as a coat film 16.

In this embodiment, the exit side corner B of the slit 3 of a downstream lip 2 is in arc or near arc shape with radius of curvature R of 5 to 45 $\mu$m. By the corner of this small radius of curvature, the hardly flowing paint dispersing magnetic iron powder of small particle size, that is, even a paint of high viscosity can naturally flow into the gap between the downstream lip 2 and base material 15, so that a uniform coat film may be obtained. Moreover, aggregates or foreign matter in the paint or dust deposits on the base material will not be caught at the corner B, so that occurrences of a vertical stripe fatal to the product quality may be suppressed. The corner B as seen from the side is an arc or a near arc shape having a specific radius of curvature, and is continuous from the side of the slit 3 to the side of the downstream lip 2, and it is important that there is no angle in the corner B. It also is important that the arc or near arc shape of the corner B is the same in shape continuously in the width direction. If it is not the same in shape, for example, if there is a local portion larger in radius of curvature in the width direction, the paint flows more easily into this portion as compared with the surrounding area between the downstream lip 2 and base material 15, and a local thick coat film is formed.

Figure 3:
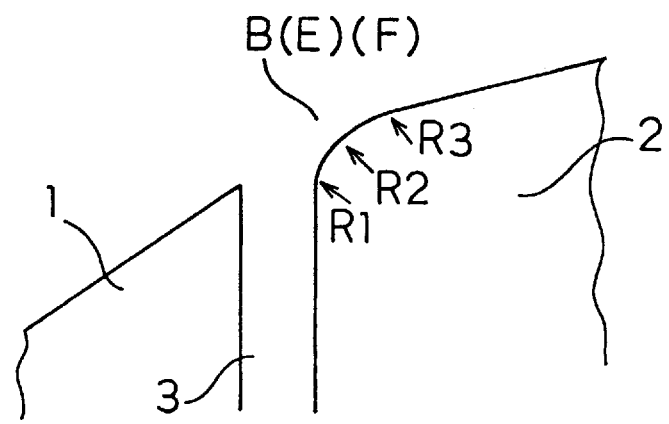
FIG. 3 is a side view of a corner in the nozzle of the first embodiment.

The radius of curvature R of the arc or near arc shape is in a range from 5 to 45 $\mu$m. If the radius of curvature is smaller than 5 $\mu$m, it causes same problems as in the conventional nozzle having a sharp edge in the corner B. That is, the radius of curvature is too small, and the effect of ease of flow of paint into the gap between the downstream lip 2 and base material 15 is lost, and thin and uniform application is not possible. At the same time the aggregates or foreign matter in the paint or dust deposits on the base material may be caught in the corner B, causing vertical stripes fatal for the product quality. On the other hand, if the radius of curvature R is larger than 45 $\mu$m, the paint flows too smoothly into the gap, and thin application is not possible, so that the effect of the invention is lost. When the corner B is a near arc shape, the radius of curvature should be also in a range of 5 to 45 $\mu$m, and plural arcs should be continuously connected and radius of curvature in a range of 5 to 45 $\mu$m be continuously connected and combined with plane surfaces. For example, a corner B of near arc shape composed of three arcs is shown in FIG. 3. That is, R1 and R2, R3 are arcs with different radii of curvature, and they are respectively connected continuously. They also satisfy the condition of 5 $\mu$m $\leq$ R1, R2, R3 $\leq$ 45 $\mu$m.

Or, as shown in FIG. 1, the downstream lip 2 is a curvature shape projecting to the base material 15 side, and its radius of curvature RL is in a range of 3 mm or more to 30 mm or less. The size of RL may be properly selected depending on the viscosity of the paint. When RL is smaller than 3 mm, the surface pressure of pressing the base material 15 to the downstream lip 2 by the tension of the base material 15 is too large, and the base material 15 cannot be lifted by the paint 17, and application is not possible. If RL is larger than 30 mm, the surface pressure of pressing the base material 15 to the downstream lip 2 by the tension of the base material 15 is too small, and air is entrapped in the paint 17 discharged from the slit 3, and pin holes are formed in the coat film 16, which is a fatal defect for the product.

Moreover, it is constituted so that any part of the upstream lip 1 may surpass to the base material 15 side from the tangent L in the corner B of the downstream lip 2. Herein, the tangent in the corner B is the tangent to the curvature surface of the downstream lip 2 when the corner B is a sharp edge, not an arc shape. In this constitution, a large pressure occurs locally in the paint 17 in the gap between the corner B and base material 15. As a result, it is possible to suppress air accompanying the base material 15 from mixing into the coat film 16 to form pin holes.

Herein, the sectional shape of the manifold 4 is a circular section in FIG. 1, but it may be also semicircular or a polygonal form. The inner diameter of the manifold 4 ranges from 5 mm to 100 mm. The gap of the slit 3 is usually in a range of 0.1 mm to 1 mm, but it is not particularly limited in this embodiment.

Below is shown the result of application of magnetic paint on the base material in order to clarify the effect of the nozzle of the embodiment.

As the paint, magnetic paint (hereinafter called paint) dispersing magnetic iron powder with particle size specified in Table 1 was applied to the base material in a dried film thickness of 2 $\mu$m. The viscosity of the paint was 37 poise when measured by type B viscometer No. 4 rotor.

conforming to the embodiment, and was 0 or sharp edge (test 1), 3 $\mu$m (test 2), and 60 $\mu$m (test 5) in the comparative tests outside the scope of the embodiment, and a total of five kinds of nozzles were fabricated. As coating length, continuous application of 4,000 m was conducted, and number of vertical stripes was visually observed, and the film thickness in the width direction was measured at 10 mm pitch by means of electronic micrometer. The results are summarized in Table 2. Film thickness fluctuations are percent expression of the fluctuations of film thickness from the average film thickness, and the product quality was judged from the measured results of vertical stripes and film thickness fluctuations and was evaluated with ○ mark if there is no problem when used as magnetic tape, and X mark if there is problem.

TABLE 2

| | | Test No. | | | | |
|---|---|---|---|---|---|---|
| | — | 1 | 2 | 3 | 4 | 5 |
| Radius of curvature of corner B | $\mu$m | 0 (sharp edge) | 3 | 5 | 45 | 60 |
| Paint | — | Composition specified in Table 1 | Composition specified in Table 1 | Composition specified in Table 1 | Composition specified in Table 1 | Composition specified in Table 1 |
| Paint viscosity | Poise | 37 | 37 | 37 | 37 | 37 |
| No. of vertical stripes | Stripes | 13 | 12 | 0 | 0 | 0 |
| Film thickness fluctuation | % | 18 | 17 | 5 | 4 | 21 |
| Remarks | — | Conventional application apparatus | Out of scope of the embodiment | Embodiment | Embodiment | Out of scope of the embodiment |
| Product quality judgement | — | X | X | ○ | ○ | X |

TABLE 1

| Magnetic iron powder | | |
|---|---|---|
| Major axis particle size | 0.18 $\mu$m | 100 parts |
| Mean axis ratio | 1:12 | |
| σs | 128 emu/g | |
| Hc | 1530 Oe | |
| Conductive carbon | | 2 parts |
| Polyurethane resin | | 10 parts |
| Vinyl chloride-vinyl acetate copolymer | | 10 parts |
| Alumina ($\alpha$-Al$_2$O$_8$) | | 5 parts |
| Stearic acid | | 2 parts |
| Butyl stearate | | 2 parts |
| Methyl ethyl ketone | | 200 parts |
| Toluene | | 180 parts |
| Cyclohexane | | 40 parts |

The base material is a polyethylene terephthalate film with thickness of 10 $\mu$m and width of 550 mm, and the paint was applied thereon in a width of 500 mm. The painting speed was 200 m/min, and the film tension was 200 g/cm. In the nozzle, the radius of curvature RL of the downstream lip was fixed at 5 mm, and the radius of curvature R of the arc shape of the corner B was 5 $\mu$m (test 3) and 45 $\mu$m (test 4)

In the nozzles of test 1 relating to a conventional nozzle and test 2 out of the scope of the embodiment, many vertical stripes were formed, and film thickness fluctuations were significant, and fatal defects for product quality were noted. In the nozzle of test 5 out of scope of the embodiment, although there were few vertical stripes owing to the arc shape of the corner B, the radius of curvature RL was too large to apply thinly, and film thickness fluctuations were very large, and the nozzle was found to have a fatal defect for the product quality. In tests 3 and 4 of the nozzles of the embodiment, even by the hardly flowing paint used in the tests, there was no vertical stripe, and film thickness fluctuations remained within several percent, and it is evident that the nozzles in the embodiment are excellent by far as compared with the conventional nozzles and nozzles out of the scope of the embodiment. In this embodiment, application of magnetic paint only is explained, but the nozzle of the embodiment can be used in application of general paints, paste, slurry, or coating solution on the base material, and it can be applied also in the field of electronic parts, for example, photosensitive film, silicone coating, battery pole plate, laminate ceramic capacitor, laminate varistor, and laminate piezoelectric element.

(Embodiment 2)

Figure 4:
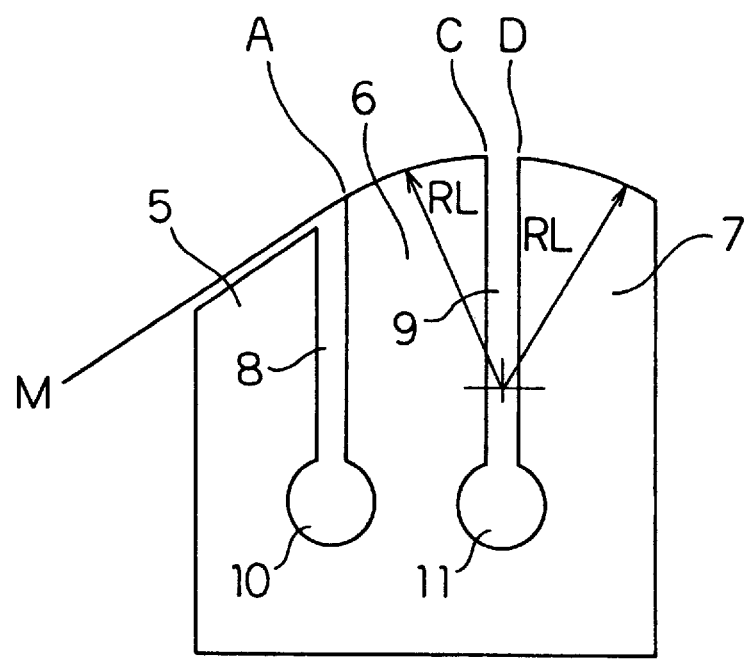
FIG. 4 is a side view of a the nozzle in a second embodiment of the invention.
Figure 5:
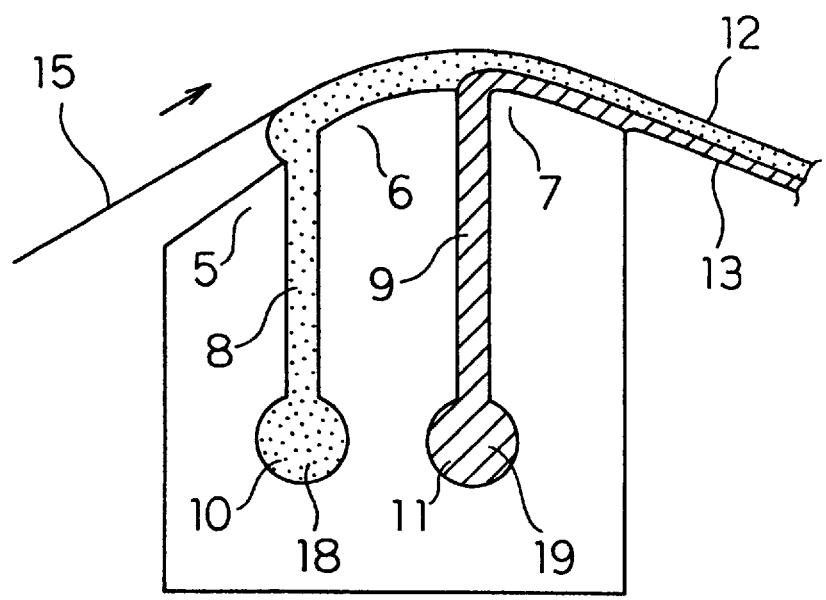
FIG. 5 is a side view of application of paint by the nozzle of the second embodiment.

FIG. 4 shows a nozzle according to a second embodiment, and FIG. 5 shows simultaneous application of a paint for lower layer and a paint for upper layer on a base material by the nozzle of the embodiment. The lower layer of paint 18 is supplied into a first manifold 10 of the nozzle by feeding means (not shown) such as pump, and is extruded from a first slit 8. The upper layer 19 of paint is supplied into a second manifold 11 of the nozzle by means of feeding means (not shown) such as pump, and is extruded from a second slit 9. To lift the base material 15 from the nozzle by the paints 18 and 19, the paints 18 and 19 are applied in a two-layer structure on the base material 15, that is, as upper layer 13 and lower layer 12.

In this embodiment, it is a greatest feature that the second lip 6 and third lip 7 are in a curvature shape projecting to the base material side, and are the same with respect to the center of the radius of curvature and identical in size. In such constitution, the curvature shapes of the front ends of the second lip 6 and third lip 7 can be ground simultaneously, and therefore the step difference of the edge C of the second lip 6 and the edge D of the third lip 7 is uniform without fluctuation in the width direction. As a result, it can suppress occurrence of unevenness of coat film thickness in the width direction due to fluctuation of step difference between edge C and edge D in the width direction, especially uneven film thickness of the upper layer, so that a magnetic tape having two-layer structure with an extremely uniform thickness of the upper layer can be produced. At the same time, the position of center of radius of curvature of the second and third lips is preferred to be present within ±2 mm in the base material running direction from the second slit 9. More preferably, the center of the radius of curvature should be present inside of the second slit.

In this constitution, when simultaneously polishing the curvature shapes of front ends of the second lip 6 and third lip 7, the center of the grinding wheel can be located at the position near the second slit 9, almost in the center of the second lip 6 and third lip 7, and therefore the pressing force of the grinding wheel may be uniformly distributed between the second lip 6 and third lip 7. As a result, defective grinding due to bias of pressing force of the grinding wheel can be suppressed, and the curvature shape of the front ends of the second lip 6 and third lip 7 can be ground precisely to a micron order.

The second lip 6 and third lip 7 are in a curvature shape projecting to the base material 15 side, and the radius of curvature RL is in a range of 3 mm or more to 30 mm or less. The size of RL may be properly selected depending on the viscosity of the paint. When RL is smaller than 3 mm, the surface pressure of pressing the base material 15 to the second lip 6 and third lip 7 by the tension of the base material 15 is too large, and the base material 15 cannot be lifted by the upper layer paint 19 and lower layer paint 18, and application is not possible. If RL is larger than 30 mm, the surface pressure of pressing the base material 15 to the second lip 6 and third lip 7 by the tension of the base material 15 is too small, and air is entrapped in the paints 18 and 19 discharged from the first slit 8 and second slit 9, and pin holes are formed in the upper layer 13 and lower layer 12, which is a fatal defect for the product.

Moreover, it is constituted so that any part of the first lip 5 may surpass to the base material 15 side from the tangent M in the edge A of the second lip 6. In this constitution, a large pressure occurs locally in the lower layer paint 18 in the gap between the edge A and base material 15. As a result, it is possible to suppress the air accompanying the base material 15 to mix into the lower layer coat film 12 to form pin holes.

The sectional shape of the first manifold 10 and second manifold 11 is a circular section in FIG. 4, but it may be also semicircular or polygonal form. The inner diameter of the manifolds 10 and 11 ranges from 5 mm to 100 mm. The gap of the first slit 8 and second slit 9 is usually in a range of 0.1 mm to 1 mm, but it is not particularly limited in this embodiment.

Figure 6:
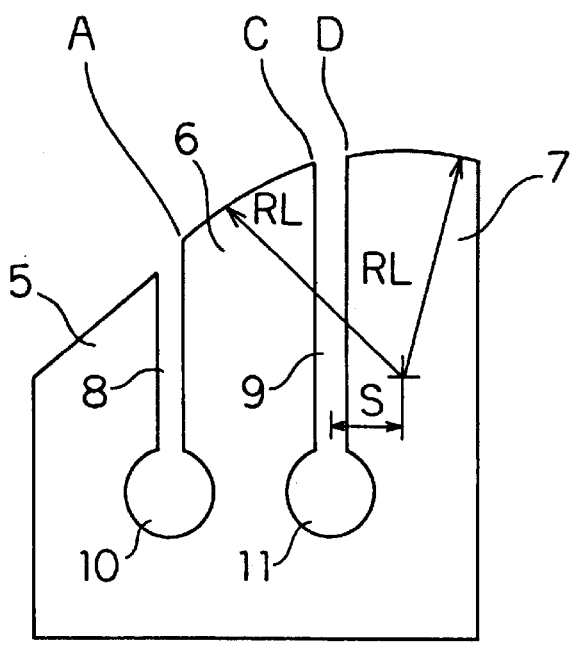
FIG. 6 is a side view of the nozzle of the second embodiment.

In other form of the embodiment, as shown in FIG. 6, the center of radius of curvature of the second lip 6 and third lip 7 may be remote from the center of the second slit 9 by dimension S. At this time, the dimension S is within 2 mm as mentioned above. Although not shown, the center of radius of curvature may also be at the second lip 6 side and the dimension S may be within 2 mm.

Below is shown the result of application of two types of magnetic paint on the base material simultaneously in two layers in order to clarify the effect of the nozzle of the embodiment.

As the lower layer paint, magnetic paint (hereinafter called lower layer paint) dispersing magnetic iron powder with particle size specified in Table 3 was used, and the viscosity of the lower layer paint was 18 poise when measured by type B viscometer No. 4 rotor. As the upper layer paint, magnetic paint (hereinafter called upper layer paint) dispersing magnetic iron oxide powder with particle size specified in Table 1 was used, and the viscosity of the upper layer paint was 37 poise when measured by type B viscometer No. 4 rotor.

TABLE 3

| Magnetic iron oxide powder | | |
|---|---|---|
| Major axis particle size | 0.2 μm | 100 parts |
| Mean axis ratio | 1:10 | |
| σs | 75 emu/g | |
| Hc | 800 Oe | |
| Conductive carbon | | 1 parts |
| Polyurethane resin | | 10 parts |
| Vinyl chloride-vinyl acetate copolymer | | 10 parts |
| Alumina (α-Al$_2$O$_8$) | | 5 parts |
| Stearic acid | | 2 parts |
| Butyl stearate | | 1 parts |
| Methyl ethyl ketone | | 200 parts |
| Toluene | | 200 parts |

The base material is a polyethylene terephthalate film with thickness of 10 μm and width of 550 mm, and the upper layer paint and lower layer paint were simultaneously applied thereon in a width of 500 mm. The upper layer was applied in a dried film thickness of 0.2 μm, and the lower layer was applied in a dried film thickness of 2 μm. The painting speed was 200 m/min, and the film tension was 200 g/cm. In the nozzle, the radius of curvature RL of the second and third lips in the nozzles of the embodiment was 3 mm (test 7) and 30 mm (test 8), and the radius of curvature RL in the comparative tests outside the scope of the embodiment was 2 m (test 6) and 40 mm (test 9), and the radius of curvature of the lip was 3 mm (test 10) in the conventional nozzle differing in the center of the radius of curvature of the second lip and third lip as disclosed in Japanese Laid-open Patent 4-22469, and a total of five kinds of nozzles were fabricated, and the paints were applied and tested.

In the obtained samples of coat films, the film thickness in the width direction was measured at 10 mm pitch by means of electronic micrometer. The results are summarized in Table 4. Film thickness fluctuations are percent expression of the fluctuations of film thickness from the average film thickness, and the product quality was judged from the measured results of vertical stripes and film thickness fluctuations and was evaluated with ○ mark if there is no problem when used as magnetic tape, and X mark if there is problem.

TABLE 4

|  |  | Test No. | | | | |
| --- | --- | --- | --- | --- | --- | --- |
|  | — | 6 | 7 | 8 | 9 | 10 |
| Radius of curvature RL | mm | 2 | 3 | 30 | 40 | 3 |
| Film thickness fluctuation | % | 28 | 4 | 5 | 12 | 20 |
| Remarks | — | Out of scope of the embodiment | Embodiment | Embodiment | Out of scope of the embodiment | Conventional application apparatus |
| Product quality judgement | — | X | ○ | ○ | X | X |

In the nozzles of test 10 relating to a conventional nozzle and tests 6 and 9 out of scope of the embodiment, film thickness fluctuations were significant, and fatal defects for product quality were noted. In tests 7 and 8 of the nozzles of the embodiment, film thickness fluctuations remained within several percent, and it is evident that the nozzles in the embodiment are excellent by far as compared with the conventional nozzles and nozzles out of the scope of the embodiment.

In this embodiment, application of magnetic paint only is explained, but the nozzle of the embodiment can be used in application of general paints, paste, slurry, or coating solution in two-layer structure on the base material, and it can be applied also in the field of electronic parts, for example, photosensitive film, silicone coating, battery pole plate, laminate ceramic capacitor, laminate varistor, and laminate piezoelectric element.

(Embodiment 3)

Figure 7:
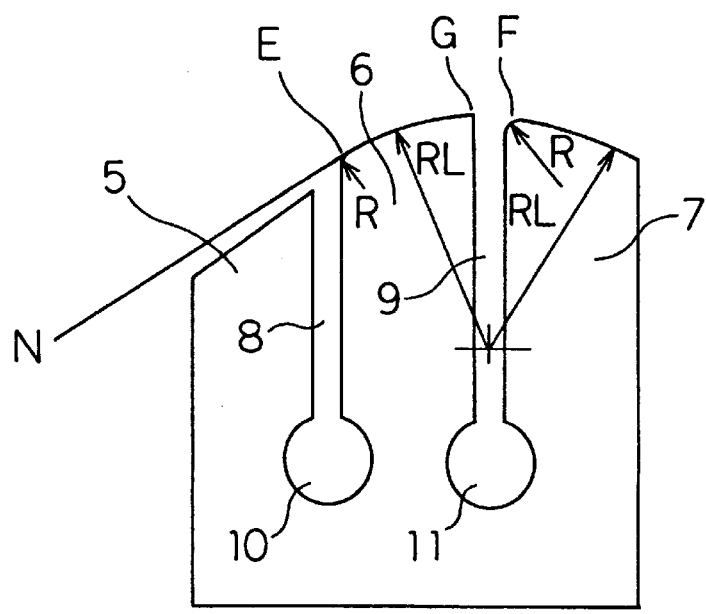
FIG. 7 is a side view of a the nozzle in a third embodiment of the invention.
Figure 8:
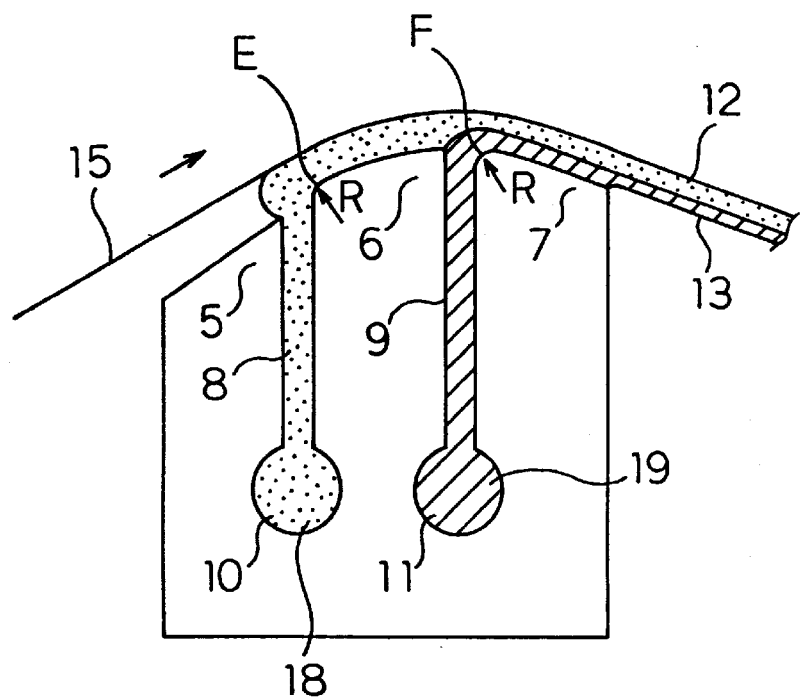
FIG. 8 is a side view of application of paint by the nozzle of the third embodiment.

FIG. 7 shows a nozzle according to a third embodiment, and FIG. 8 shows simultaneous application of a lower layer of paint and an upper layer of paint on a base material by the nozzle of the embodiment. The paint for lower layer 18 is supplied into a first manifold 10 of the nozzle by means of feeding means (not shown) such as pump, and is extruded from a first slit 8. The paint for upper layer 19 is supplied into a second manifold 11 by means of feeding means (not shown) such as pump, and is extruded from a second slit 9. To lift the base material 15 from the nozzle by the paints 18 and 19, the paints 18 and 19 are applied in a two-layer structure on the base material 15, that is, as upper layer 13 and lower layer 12.

It is a first feature of the embodiment that the second lip 6 and third lip 7 are in a curvature shape projecting to the base material side, and are the same with respect to the center of the radius of curvature and identical in size. In such constitution, the curvature shapes of the front ends of the second lip 6 and third lip 7 can be ground simultaneously, and therefore the step difference of the edge G of the second lip 6 and the corner F of the third lip 7 is uniform without fluctuation in the width direction. As a result, it can suppress occurrence of unevenness of coat film thickness in the width direction due to fluctuation of step difference between edge G and corner F in the width direction, especially uneven film thickness of the upper layer, so that a magnetic tape in two-layer structure of an extremely uniform thickness of upper layer can be produced.

At the same time, the position of center of radius of curvature of the second and third lips is preferred to be present within ±2 mm in the base material running direction from the second slit 9. More preferably, the center of the radius of curvature should be present inside of the second slit. In this constitution, when simultaneously polishing the curvature shapes of front ends of the second lip 6 and third lip 7, the center of the grinding wheel can be located at the position near the second slit 9, almost in the center of the second lip 6 and third lip 7, and therefore the pressing force of the grinding wheel may be uniformly distributed between the second lip 6 and third lip 7. As a result, defective grinding due to bias of pressing force of the grinding wheel can be suppressed, and the curvature shape of the front ends of the second lip 6 and third lip 7 can be ground precisely to a micron order.

It is a second feature of the embodiment that the exit side corner E of the first slit 8 of the second lip 6 and the exit side corner F of the second slit 9 of the third lip 7 are in arc or near arc shape with radius of curvature R of 5 to 45 $\mu$m. By this corner portion, the hardly flowing paint dispersing magnetic iron powder of small particle size, that is, even a paint of high viscosity can naturally flow into the gap between the second lip 6 and third lip 7 and base material 15, so that a uniform coat film may be obtained. In particular, it is effective when forming the upper layer 13 in a sub-micron order, for example, very thinly at 0.1 to 0.5 $\mu$m. Moreover, aggregates or foreign matter in the paint or dust deposits on the base material will not be caught in the corner F, so that occurrences of vertical stripe fatal to the product quality may be suppressed.

The corner as seen from the side is an arc or a near arc shape having a specific radius of curvature, and is continuous from the side of the first slit 8 to the side of the second lip 6 and is continuous from the side of the second slit 9 to the side of the third lip 7, and it is important that there is no angle in the corners E and F. It also important that the arc or near arc shape of the corners E and F is the same in shape continuous in the width direction. If they are not the same in shape, for example, if there is a local portion larger in radius of curvature in the width direction, the paint flows more easily into this portion as compared with the surrounding area between the second or third lip and base material 15, and a local thick coat film is formed.

The radius of curvature R of the arc or near arc shape is in a range from 5 to 45 $\mu$m. If the radius of curvature is smaller than 5 $\mu$m, it causes the same problems as in the conventional nozzle having a sharp edge in the corner E or F. That is, the radius of curvature is too small, and the effect of ease of flow of paint into the gap between the second lip 6 or third lip 7 and base material 15 is lost, and thin and uniform application is not possible, and at the same time the aggregates or foreign matter in the paint or dust deposits on the base material may be caught in the corner E or F, causing vertical stripes fatal for the product quality on the other hand, if the radius of curvature R is larger than 45 $\mu$m, the paint flows too smoothly into the gap, and thin application is not possible, so that the effect of the invention, in particular, the effect of applying the upper layer 13 thinly and uniformly in a sub-micron order, is lost. When the corner E or F is a near arc shape, the radius of curvature R should be also in a range of 5 to 45 $\mu$m, and plural arcs should be continuously connected and combined, or arcs at the radius of curvature in a range of 5 to 45 $\mu$m may be continuously connected and combined with plane sections. For example, a corner E or F of near arc shape composed of three arcs is shown in FIG. 3. That is, R1 and R2, R3 are arcs with different radii of curvature, and they are respectively connected continuously. They also satisfy the condition of 5 $\mu m \leq R1, R2, R3 \leq 45$ $\mu m$. The radius of curvature R of the corners E and F can be freely selected in the range of 5 to 45 $\mu m$, and may not be identical.

The second lip 6 and third lip 7 are in a curvature shape projecting to the base material 15 side, and the radius of curvature RL is in a range of 3 mm or more to 30 mm or less. The size of RL may be properly selected depending on the viscosity of the paint. When RL is smaller than 3 mm, the surface pressure of pressing the base material 15 to the second lip 6 and third lip 7 by the tension of the base material 15 is too large, and the base material 15 cannot be lifted by the upper layer paint 19 and lower layer paint 18, and application is not possible. If RL is larger than 30 mm, the surface pressure of pressing the base material 15 to the second lip 6 and third lip 7 by the tension of the base material 15 is too small, and air is entrapped in the paints 18 and 19 discharged from the first slit 8 and second slit 9, and pin holes are formed in the upper layer 13 and lower layer 12, which is a fatal defect for the product.

Moreover, it is constituted so that any part of the first lip 5 may surpass to the base material 15 side from the tangent N in the corner E of the second lip 6. Herein, the tangent in the corner E refers to the tangent to the curvature shape of the second lip 6 when the corner E is a sharp edge, not a curvature shape. In this constitution, a large pressure occurs locally in the lower layer paint 18 in the gap between the corner E and base material 15. As a result, it is possible to suppress the air accompanying the base material 15 to mix into the coat film of the lower layer 12 to form pin holes.

The sectional shape of the first manifold 10 and second manifold 11 is a circular section in FIG. 7, but it may be also semicircular or a polygonal form. The inner diameter of the manifolds 10 and 11 ranges from 5 mm to 100 mm. The gap of the first slit 8 and second slit 9 is usually in a range of 0.1 mm to 1 mm, but it is not particularly limited in this embodiment.

Figure 9:
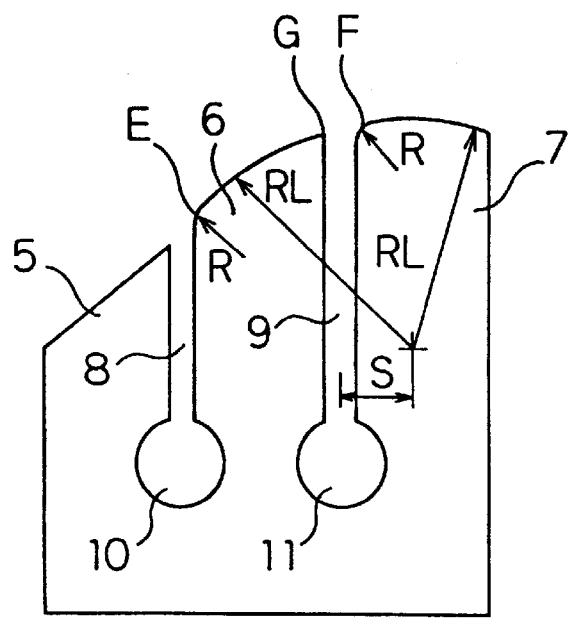
FIG. 9 is a side view of the nozzle of the third embodiment.

In other forms of the embodiment, as shown in FIG. 9, the center of radius of curvature RL of the second lip 6 and third lip 7 may be remote from the center of the second slit 9 by dimension S. At this time, the dimension S is within 2 mm as mentioned above. Although not shown, the center of radius of curvature RL may also at the second lip 6 side and the dimension S may be within 2 mm.

Below is shown the result of application of two types of magnetic paint on the base material simultaneously in two layers in order to clarify the effect of the nozzle of the embodiment.

As the lower layer paint, magnetic paint (hereinafter called lower layer paint) dispersing magnetic iron oxide powder with particle size specified in Table 3 was used, and the viscosity of the lower layer paint was 18 poise when measured by type B viscometer No. 4 rotor. As the upper layer paint, magnetic paint (hereinafter called upper layer paint) dispersing magnetic iron oxide powder with particle size specified in Table 1 was used, and the viscosity of the upper layer paint was 37 poise when measured by type B viscometer No. 4 rotor. The base material was a polyethylene terephthalate film with thickness of 10 $\mu m$ and width of 550 mm, and the upper layer paint and lower layer paint were simultaneously applied thereon in a width of 500 mm. The upper layer was applied in a dried film thickness of 0.2 $\mu m$, and the lower layer was applied in a dried film thickness of 2 $\mu m$. The painting speed was 200 m/min, and the film tension was 200 g/cm.

The following ten nozzles were fabricated, and the paints were applied and tested, that is, as the nozzles of the embodiment, a nozzle of which radius of curvature RL of the second and third lips was 3 mm, radius of curvature of the corner E was 5 $\mu m$, and radius of curvature of the corner F was 5 $\mu m$ (test 11), a nozzle of which radius of curvature RL of the second and third lips was 30 mm, radius of curvature of the corner E was 5 $\mu m$, and radius of curvature of the corner F was 5 $\mu m$ (test 12), a nozzle of which radius of curvature RL of the second and third lips was 3 mm, radius of curvature of the corner E was 45 $\mu m$, and radius of curvature of the corner F was 45 $\mu m$ (test 13), and a nozzle of which radius of curvature RL, of the second and third lips was 3 mm, radius of curvature of the corner E was 10 $\mu m$, and radius of curvature of the corner F was 30 $\mu m$, being different in the radius of curvature between the corners E and F (test 14); as the nozzles out of the scope of the embodiment for comparative tests, a nozzle of which radius of curvature RL of the second and third lips was 3 mm, radius of curvature of the corners E and F was 0 $\mu m$, that is, a sharp edge (test 15), a nozzle of which radius of curvature RL of the second and third lips was 3 mm, radius of curvature of the corner E was 3 $\mu m$, and radius of curvature of the corner F was 3 $\mu m$ (test 16), a nozzle of which radius of curvature RL of the second and third lips was 3 mm, radius of curvature of the corner E was 60 $\mu m$, and radius of curvature of the corner F was 60 $\mu m$ (test 17), a nozzle of which radius of curvature RL of the second and third lips was 2 mm, radius of curvature of the corner E was 5 $\mu m$, and radius of curvature of the corner F was 5 $\mu m$ (test 18), and a nozzle of which radius of curvature RL of the second and third lips was 40 mm, radius of curvature of the corner E was 5 $\mu m$, and radius of curvature of the corner F was 5 $\mu m$ (test 19); and moreover as a conventional nozzle, a nozzle of which center of radius of curvature of the second and third lips was remote by 2 mm, with radius of curvature of the lip of 3 mm in Japanese Laid-open Patent 4-22469, and having a sharp edge in the corners E and F (test 20).

As coating length, continuous application of 4,000 m was conducted, and number of vertical stripes was visually observed, and the film thickness in the width direction was measured at 10 mm pitch by means of electronic micrometer. The results are summarized in Table 5. Film thickness fluctuations are percent expression of the fluctuations of film thickness from the average film thickness, and the product quality was judged from the measured results of vertical stripes and film thickness fluctuations and was evaluated with ○ mark if there is no problem when used as magnetic tape, and X mark if there is problem.

TABLE 5-1

|  |  | Test No. | | | | |
| --- | --- | --- | --- | --- | --- | --- |
|  | — | 11 | 12 | 13 | 14 | 15 |
| Radius of curvature of corner E | $\mu m$ | 5 | 5 | 45 | 10 | 0 (sharp edge) |
| Radius of | $\mu m$ | 5 | 5 | 45 | 30 | 0 |

TABLE 5-1-continued

|  |  | Test No. | | | | |
| --- | --- | --- | --- | --- | --- | --- |
|  | — | 11 | 12 | 13 | 14 | 15 |
| curvature of corner F |  |  |  |  |  | (sharp edge) |
| Radius of curvature RL | mm | 3 | 30 | 3 | 3 | 3 |
| Remarks | — |  | Embodiment |  |  | Out of scope of the embodiment |
| No. of vertical stripes | Stripes | 0 | 0 | 0 | 0 | 15 |
| Film thickness fluctuation | % | 3 | 5 | 4 | 3 | 17 |
| Product quality judgement | — | ○ | ○ | ○ | ○ | X |

TABLE 5-2

|  |  | Test No. | | | | |
| --- | --- | --- | --- | --- | --- | --- |
|  | — | 16 | 17 | 18 | 19 | 20 |
| Radius of curvature of corner E | μm | 3 | 60 | 5 | 5 | 0 (sharp edge) |
| Radius of curvature of corner F | μm | 3 | 60 | 5 | 5 | 0 (sharp edge) |
| Radius of curvature RL | mm | 3 | 3 | 2 | 40 | 3 (however, center position is different) |
| Remarks | — | Out of scope of the embodiment | | | | Conventional application apparatus |
| No. of vertical stripes | Stripes | 13 | 0 | 0 | 0 | 18 |
| Film thickness fluctuation | % | 17 | 21 | 18 | 22 | 25 |
| Product quality judgement | — | X | X | X | X | X |

In the nozzles of test 20 relating to a conventional nozzle and tests 15 to 19 out of scope of the embodiment, vertical stripes or film thickness fluctuations, or both were significant, and fatal defects for product quality were noted. For example, in tests 15 and 16, the radius of curvature of the arc shape of the corners E and F was 3 μm, out of the scope of the embodiment, being a sharp edge, foreign matter or aggregates in the paint or dust deposits on the film were caught in the corner, and vertical stripes occurred significantly. Further, the high viscosity paint hardly flowed into the gap between the second and third lips and the film, film thickness fluctuations were significant, and there were fatal defects for product quality as magnetic tape.

In tests 11 to 14 of the nozzles of the embodiment, there was no vertical stripe, and film thickness fluctuations remained within several percent, and it is evident that the nozzles in the embodiment are excellent by far as compared with the conventional nozzle and nozzles out of the scope of the embodiment.

In this embodiment, application of magnetic paint only is explained, but the nozzle of the embodiment can be used in application of general paints, paste, slurry, or coating solution in a two-layer structure on the base material, and it can be applied also in the field of electronic parts, for example, photosensitive film, silicone coating, battery pole plate, laminate ceramic capacitor, laminate varistor, and laminate piezoelectric element.

(Embodiment 4)

A processing method of nozzle in a fourth embodiment of the invention is described below while referring to the drawings.

Figure 10:
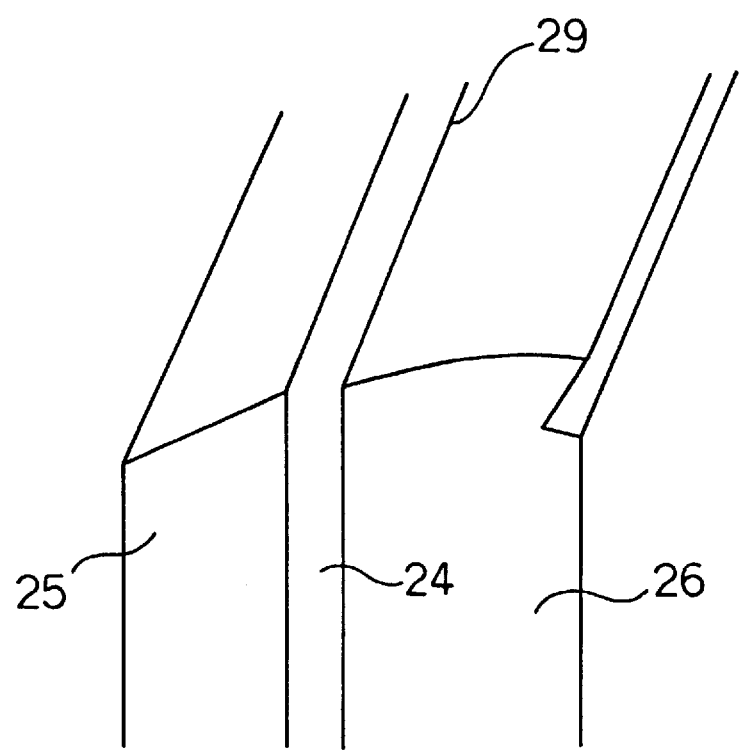
FIG. 10 is a perspective view before nozzle processing in a fourth embodiment of the invention.
Figure 11:
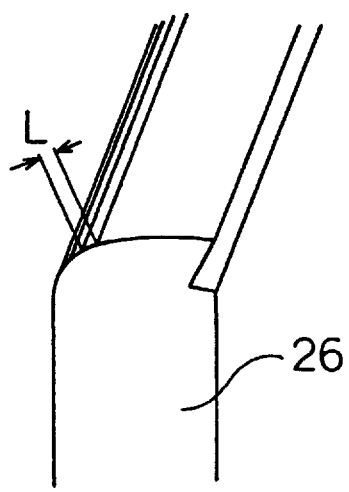
FIG. 11 is a perspective view of a nozzle polygonal shape in the fourth embodiment.

FIG. 10 is a perspective view of nozzle front end portion before processing, and an edge 29 is still a sharp edge. This edge 29 is ground into a polygonal form as shown in FIG. 11 by means of a plane grinding wheel. At this time, the chamfering width L is in a range of 2 to 100 μm. Either the nozzle or the plane grinding wheel (not shown) is inclined, and the edge 29 is ground and chamfered in the width direction of the nozzle. By repeating this operation at least twice, a polygonal form as shown in FIG. 11 is obtained. Hence, precise polygonal chamfering with the width precision of chamfering width L of micron order precision is realized.

As a method of grinding, a method of using a plane grinder is described. Abrasive grains of a grinding wheel are selected from WA, AA, GC, C and other grades depending on the nozzle material, and the wheel are dressed to a width easy for grinding depending on the chamfering width. A nozzle is mounted parallel to the wheel in an electromagnetic chuck on the table of the plane grinder (long table type), and when chamfering, for example, four sides, the table is inclined by 18°, the slit exit side edge of the lip is ground in the width direction at the chamfering width setting of 6 μm. At this time, the force of the wheel to push the edge is in a range of 50 to 500 g/cm. The table is further inclined by 18° to grind. By repeating this method, the four sides are chamfered at high precision. This method can be employed also in chamfering of two sides or chamfering or any plural sides by proper setting of angle and chamfering width.

In other example of grinding method, using oil stone (hand lapper) grain size #240 to #600 or diamond file #140 to #170, a grinding method by hand finish is also known. Different from the preceding example, for angle adjustment to form a polygonal profile, it is intended to grind while inclining the abrasive with the work piece fixed. For instance, using the hand lapper grain size #320, with the chamfering width set at 10 μm, grinding while checking the chamfering width by a differential interference microscope, by changing the grinding angle of the hand lapper, for example, three times, three sides can be chamfered at high precision. This method may be also employed in chamfering of two or more sides.

Figure 12:
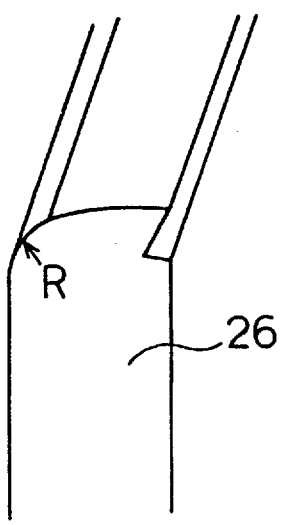
FIG. 12 is a perspective view of a nozzle curvature shape in the fourth embodiment.

A method of lap finishing is described below. Since the lapping tape is weak in grinding force, it is possible to grind only nearly the peaks of a polygon without sacrificing the precision of the polygon formed by grinding. From the study of grain size of lapping tape, grains coarser than grain size #500, for example, #100 and #150, were likely to cause flaw on the lane surface of the polygon due to drop of abrasive grains, and it was hard to use from the viewpoint of precision. In the lapping tape with grain size finer than #15000, the grinding capacity was insufficient, and the surface could not be formed into a curvature. The grain size of the lapping tape can be selected properly depending on the material of the nozzle lip. As a result of study, for example, in the case of nozzle lip made of cemented carbide, by a method of finishing into a smooth surface by grinding the peaks of the polygon with grain size #1000 and polishing and finishing the chamfered surface with grain size #8000, the polygonal surface could be processed into a smooth curvature at high precision, and chamfering in a range of radius of curvature R of 5 to 45 μm shown in FIG. 12 is realized.

The lap finishing method is more specifically described below. In lap finishing by hand finish, fine grinding is possible by the feel of the fingertip. It is intended to grind in the nozzle width direction while holding the lapping tape with grain size #4000 by fingertip. According to the study by the present inventor, while confirming the state (contamination) of the lapping tape, grinding is continued until contamination is eliminated, and grinding is resumed by changing to grain size #6000. As a result, the polygonal surface can be processed into a smooth curvature at high precision. Hence, in the nozzle width direction, the shape of the curvature may be uniform.

(Embodiment 5)

A processing method of nozzle in a fifth embodiment of the invention is described below. In the processing method of this embodiment, largely different from the preceding processing method using the plane grinding wheel, it is intend to process directly into a curvature shape, without the intermediate step from polygon to curvature, by using an electric discharge cutting machine. In this method, an electric discharge is formed between the work piece (nozzle) and the electrode, and it is processed by this electric discharge action. For example, the electrode is processed into a desired curvature shape, for example, a radius of curvature of 30 μm, and by cutting in the nozzle width direction by electric discharge by using the electric discharge cutting machine, chamfering is done in a radius of curvature of 30 μm. In the method of this embodiment, since the cut surface is not mirror-smooth, it is necessary to finish by lapping in the same method as in the processing method in embodiment 4. For example, by lapping tape with grain size #500, asperities formed by electric discharge cutting are ground, and precision grinding is done by grain size #1000 and #4000. Further by grain size of #8000 and #10000, the surface is finished by polishing, so that smooth chamfering in a small area is possible in a range of radius of curvature of 5 to 45 μm.

(Embodiment 6)

Figure 13:
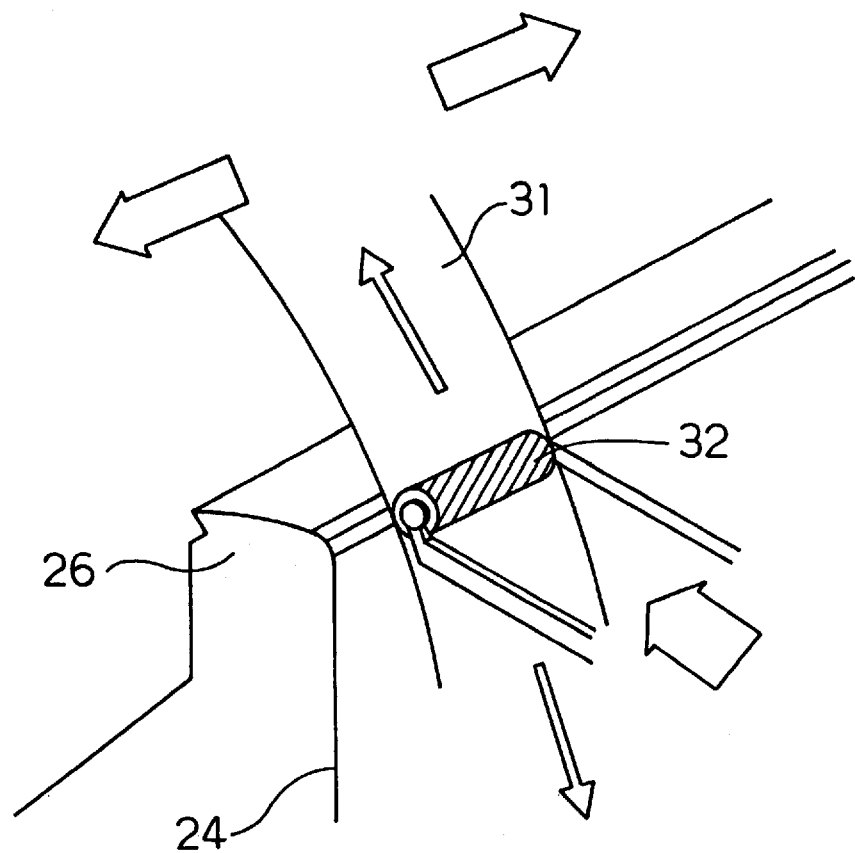
FIG. 13 is a perspective view of a super-burnishing machine in a nozzle processing method in a sixth embodiment of the invention.
Figure 14:
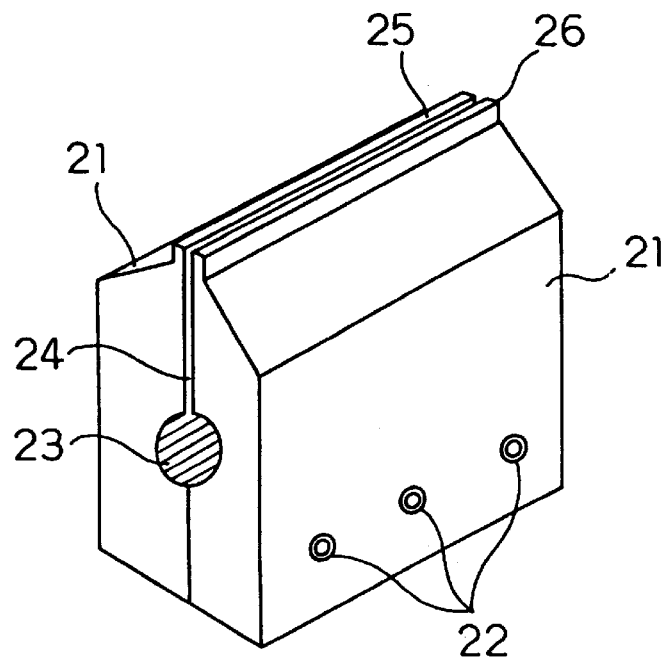
FIG. 14 is a schematic diagram of a nozzle in a prior art.
Figure 15:
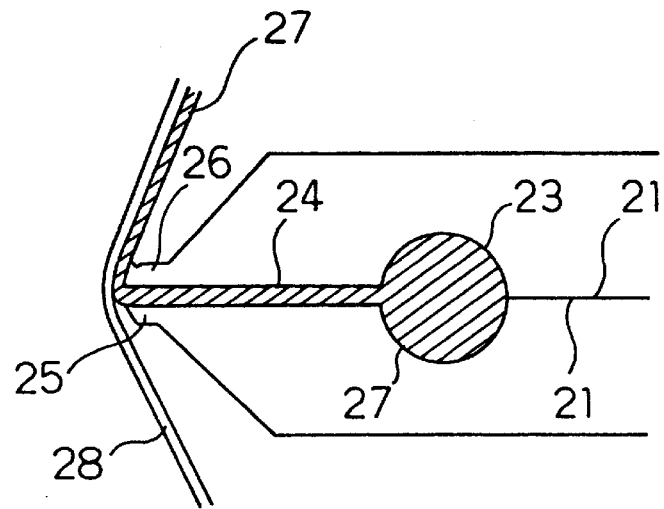
FIG. 15 is a sectional view showing a state of use of the nozzle in the prior art.
Figure 16:
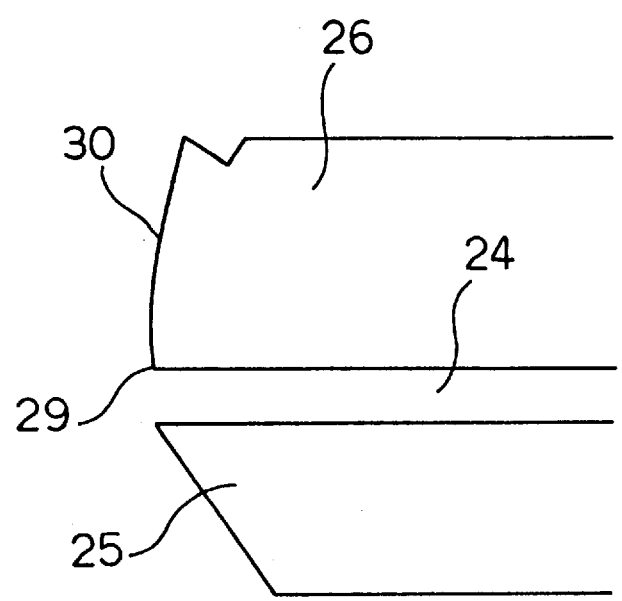
FIG. 16 is a side view of a front end of the nozzle in the prior art.

A processing method of nozzle in a sixth embodiment of the invention is described below. In the processing method of this embodiment, the slit exit side edge of the downstream lip processed into polygonal form or curvature form by grinding or electric discharge cutting is lap finished by using a super-burnishing machine. As an example processing method, in the constitution of the lapping tape of embodiment 4, as shown in FIG. 13, a lapping tape 31 is fitted to the polygonal surface of nozzle edge, and the lapping tape 31 is held and pressed by a backup roll 32 (rubber roll). The lapping tape 31 oscillates in the tape longitudinal direction, and it is further polished by moving in the nozzle width direction. In this method, too, the curvature in the nozzle width direction can be finished to a smoother surface at a uniform precision.

(Embodiment 7)

A seventh embodiment of the invention corresponds to a processing method of nozzle of the invention relating to claim 26.

Figure 17:
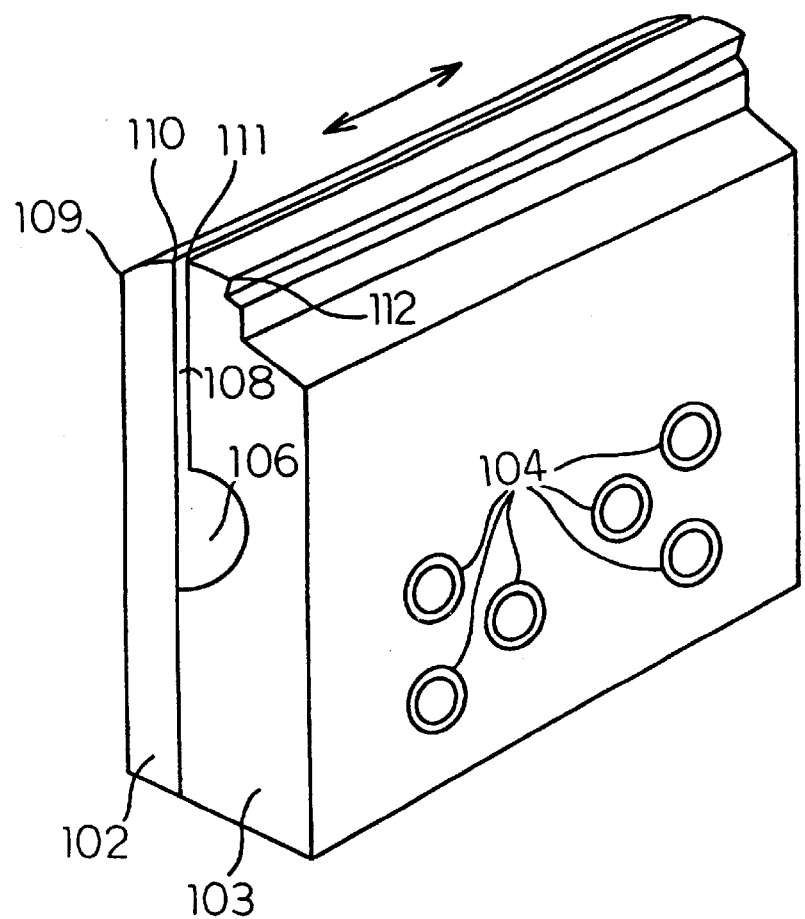
FIG. 17 is a perspective view before nozzle processing in a seventh embodiment of the invention.
Figure 21:
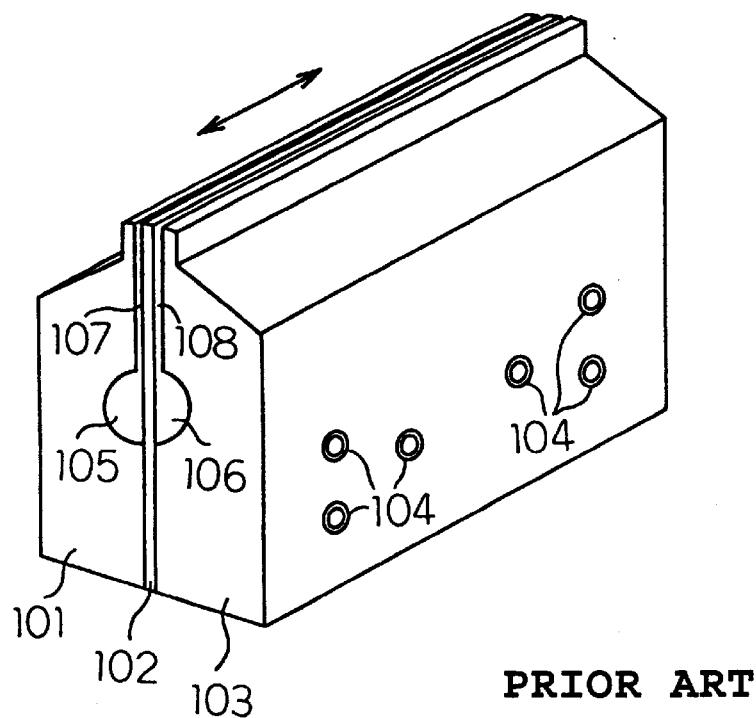
FIG. 21 is a schematic diagram of a nozzle having two slits in a prior art.
Figure 22:
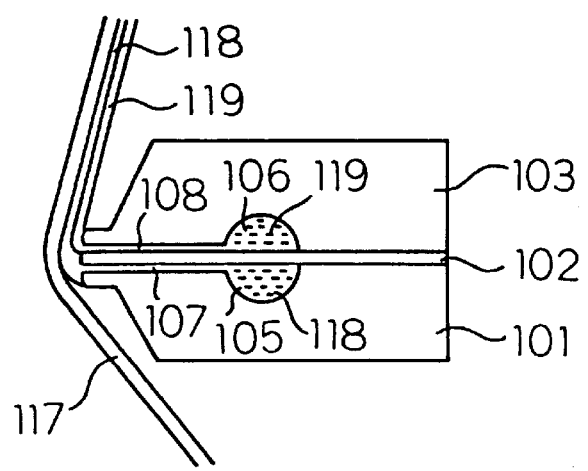
FIG. 22 is a sectional view showing a state of use of the nozzle in the prior art.
Figure 23:
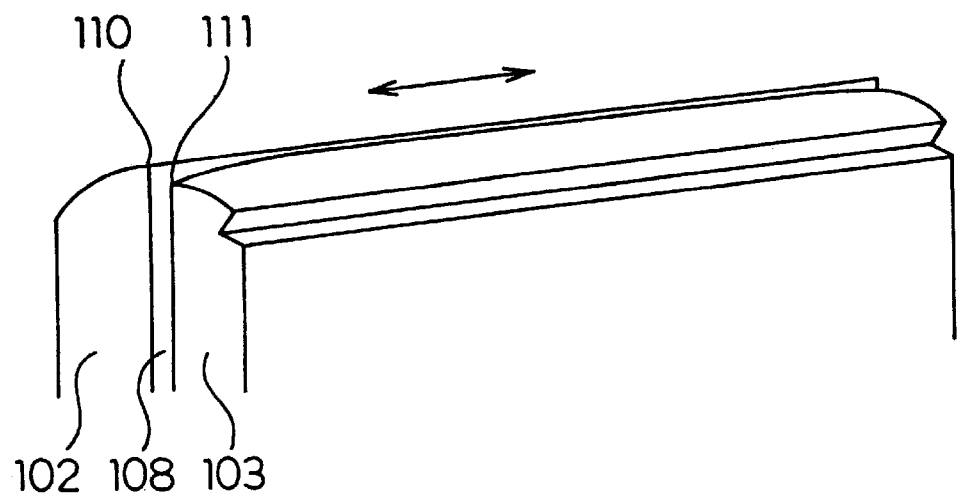
FIG. 23 is a perspective view of a front end of the nozzle in the prior art.

For example, a processing method of nozzle having two slits as shown in FIG. 21 is explained. As shown in FIG. 17, a second block 102 and a third block 103 are coupled by bolts 104 to form into a pair, and put on a grinder, and the front ends are ground in the block width direction. Incidentally, the second block 102 and third block 103 in FIG. 17 are different in shape from the blocks in FIG. 21. In this method, the second block 102 and third block 103 are ground and processed simultaneously as a pair, and therefore fluctuations of the step difference between the exit side edge 110 at the front end of the second block and the entry side edge 111 at the front end of the third block can be eliminated in the width direction.

Figure 18:
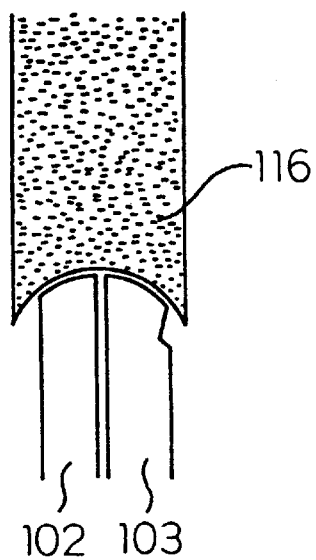
FIG. 18 is a front view of a grinding wheel in seventh, eighth and ninth embodiments of the invention.

As shown in FIG. 18, a grinding wheel 116 used in this grinding has an arc section, and its radius of curvature is equal to the radius of curvature in the shape of the front end of the block. The radius of curvature of the arc shape is about 3 to 30 mm. By rotating the grinding wheel 116, the grinding wheel 116 is kept in contact with the front ends of the blocks 102, 103, and the table on which the blocks 102, 103 are mounted is fed at constant speed in the width direction to process. Other grinding conditions are properly selected.

Figure 24:
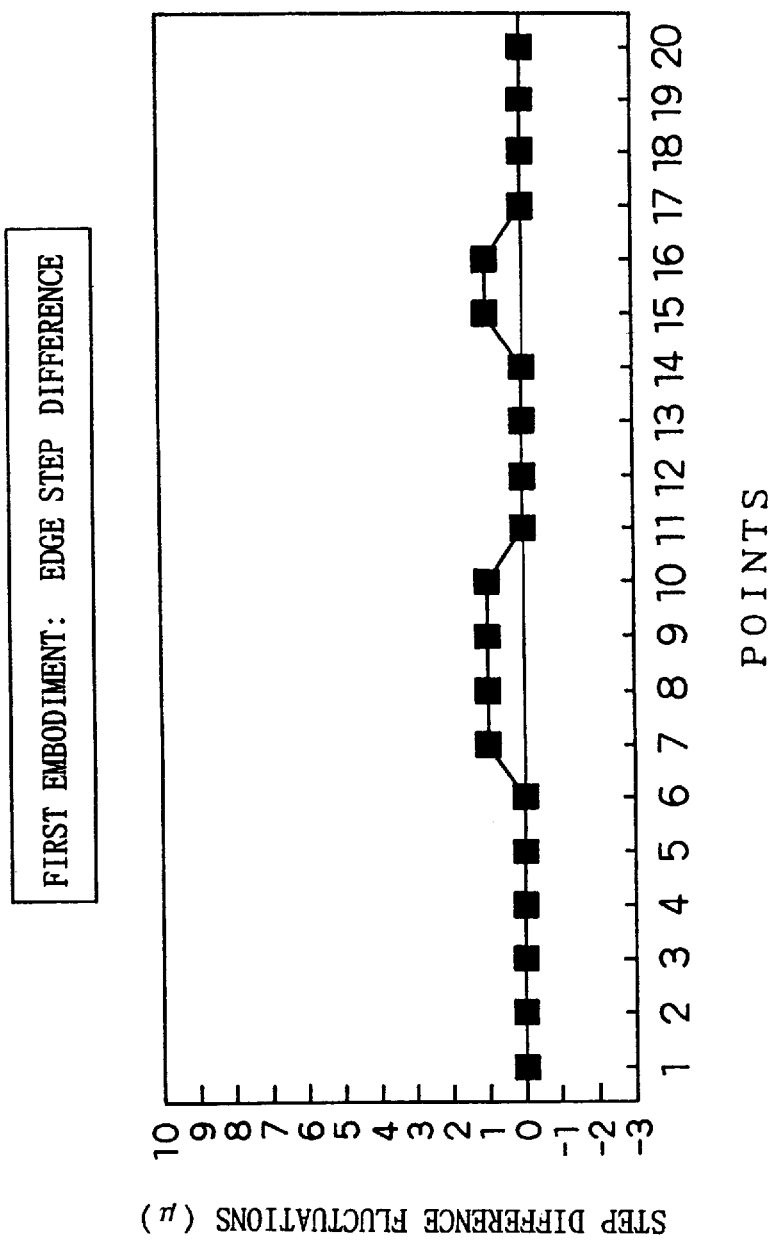
FIG. 24 is a graph showing results of measuring step difference fluctuations in the seventh embodiment of the invention.

FIG. 24 shows results of measurement of step difference fluctuations in the block width direction between the exit side edge 110 at the front end of the second block 102 and the entry side edge 111 at the front end of the third block 103. The measuring instrument was a three-dimensional measuring instrument of Toyo Precision, and it was measured at 10 mm pitch in the width direction.

In the processing method of the embodiment, step difference fluctuations in the width direction of blocks settle within 1 μm. As compared with the step difference fluctuations of 7 μm in the conventional method shown in FIG. 28, it is evident that the edge step difference is made uniform in the invention.

The thickness error of upper layer of the magnetic tape composed of two layers applied simultaneously by the nozzle fabricated in the processing method of nozzle in the embodiment was within 3%. As a result of similar application by the nozzle by the conventional processing method, the thickness error of upper layer was 10%, and it is evident that the nozzle fabricated by the nozzle processing method of the embodiment is excellent in the effect of suppressing the uneven thickness of coat film.

(Embodiment 8)

An eighth embodiment of the invention.

Figure 19:
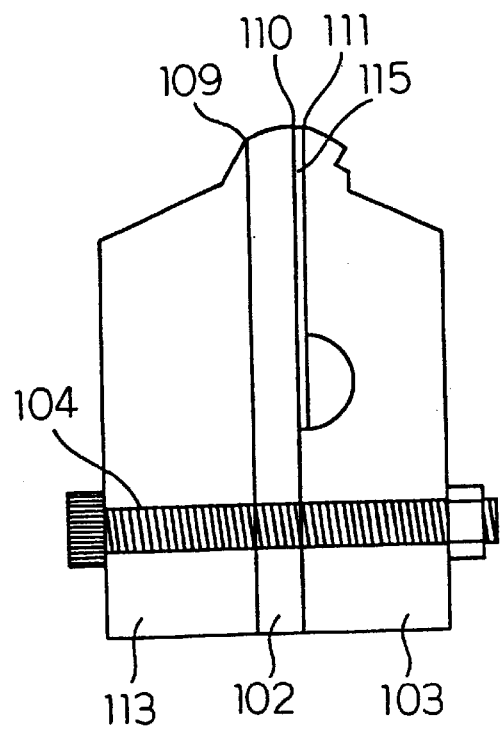
FIG. 19 is a side view at the time of nozzle processing in the eighth embodiment of the invention.

A processing method of nozzle having two slits is described. As shown in FIG. 19, a second block 102 of thin block thickness is crimped and fixed by support members 113, 114 from both sides in the thickness direction, and the front end of the block is ground and processed in the block width direction. As a result, the apparent rigidity of the block is enhanced, and it prevents warp and deflection of the block occurring due to the pressing force of the grinding wheel to the front end of the block at the time of processing and grinding, and the front end edge can be processed at precise straightness in the block width direction. In this method, it is particularly effective in grinding and processing of thin block in a thickness of 2 mm to 10 mm.

The support members 113, 114 are made of metal, and crimp the second block 102 with bolts 104. The height of the support members 113, 114 is limited to such a degree that may not interfere the grinding wheel, and the junction flatness should be 10 μm or less. If the flatness is inferior, the second block 102 may be deformed by the effects of the flatness of the support members 113, 114, and the straightness of the edges 109, 110 at the front end of the second block may be poor.

As shown in FIG. 18, the grinding wheel 116 used in this grinding has an arc section, and the radius of curvature is equal to the shape of the radius of curvature at the front end of the block. The radius of curvature of the arc shape is about 3 to 30 mm. By rotating the grinding wheel 116 and keeping the grinding wheel 116 in contact with the front end of the second block 102, the table on which the second block 102 is placed is fed at constant speed in the width direction to process. The other grinding conditions are properly selected.

Figure 25:
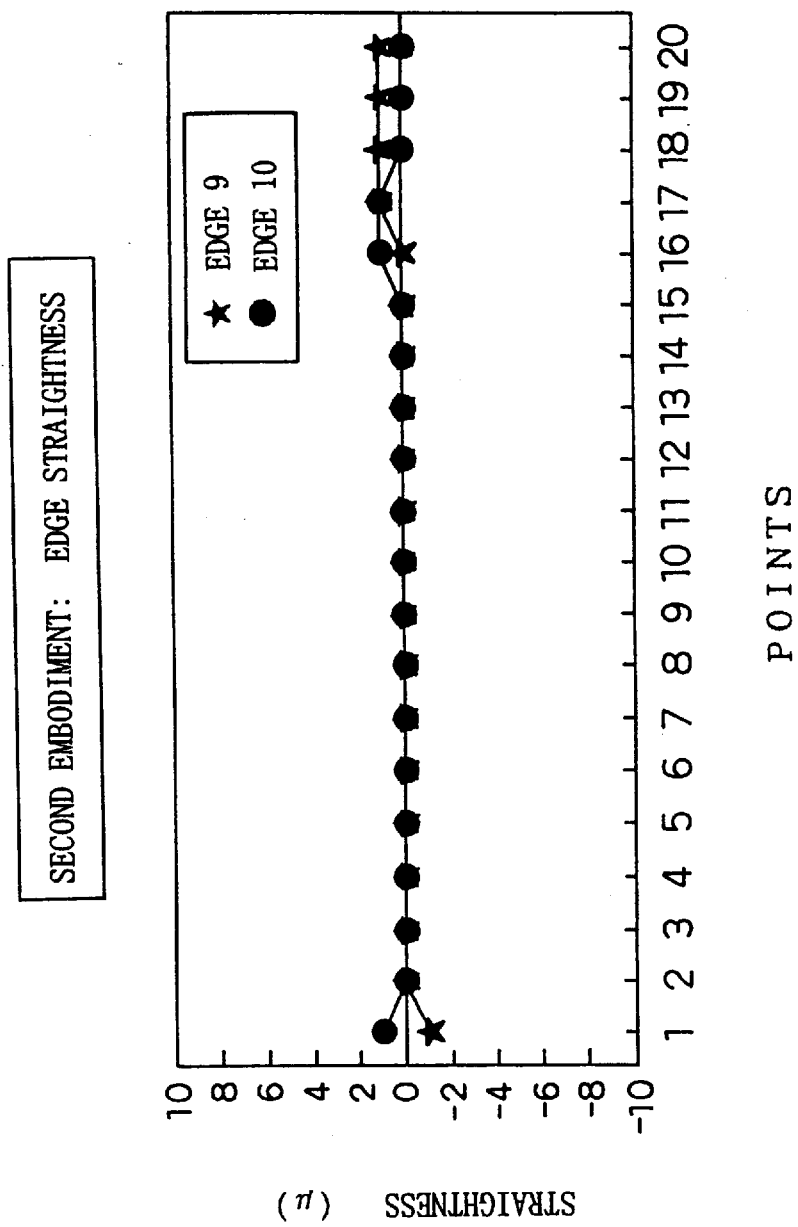
FIG. 25 is a graph showing results of measuring edge straightness in the eighth embodiment of the invention.

FIG. 25 shows results of measurement of straightness in the block width direction of the edges 109, 110 at the front end of the second block 102. The measuring instrument was a three-dimensional measuring instrument of Toyo Precision, and it was measured at 10 mm pitch in the width direction.

In the processing method of the invention, the edge straightness in the block width direction settles within 1 μm. As compared with the edge straightness of 10 μm in the conventional processing method in FIG. 13, the invention evidently keeps the edge straightness uniform.

The thickness error of upper layer of the magnetic tape composed of two layers applied simultaneously by the nozzle fabricated in the processing method of nozzle in the embodiment was within 3%. As a result of similar application by the nozzle by the conventional processing method, the thickness error of upper layer was 10%, and it is evident that the nozzle fabricated by the nozzle processing method of the embodiment is excellent in the effect of suppressing the uneven thickness of coat film.

(Embodiment 9)

Will now be described.

Figure 20:
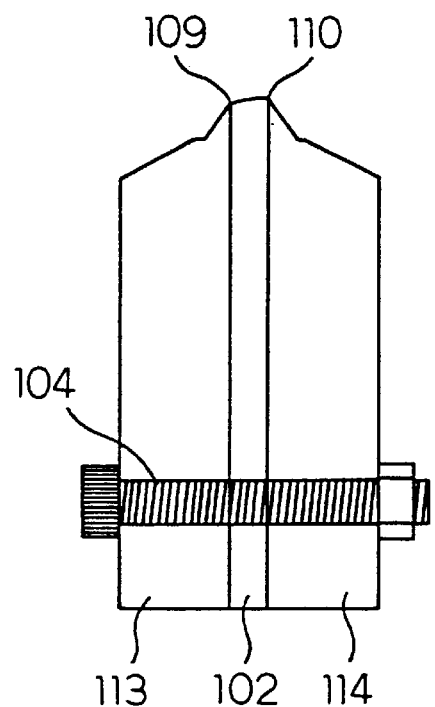
FIG. 20 is a side view at the time of nozzle processing in the ninth embodiment of the invention.

A processing method of nozzle having two slits is described. As shown in FIG. 20, a support member 113 abuts against a second block 102 from its thickness direction side, and a third block 103 is overlaid. A support member 115 is inserted in a slit formed between the second and third blocks 102 and 103. These members are coupled and fixed with bolts 104, and they are mounted as a pair on the grinder, and the front ends are ground and processed in the block width direction. In this method, since the second block 102 and third block 103 are ground and processed as a pair, the step difference between the exit side edge 110 at the front end of the second block 102 and the entry side edge 111 at the front end of the third block 103 is free from fluctuation in the width direction. Moreover, since the second block 102 is held between the support members 113 and 115, the apparent rigidity of the block is enhanced, and it prevents warp and deflection of the block occurring due to pressing force of the grinding wheel on the front end of the block at the time of processing and grinding, so that the entry side edge 109 at the front end of the second block 102 can be processed at precise straightness in the block width direction. This method is particularly effective in grinding and processing of a thin second block 102 in a thickness of 2 to 10 mm.

The support members 113, 115 are made of metal, and the support member 113 grips the second block 102 with the third block 103, and the support member 115 is inserted into a second slit 108. The height of the support members 113, 115 is limited to such a degree that may not interfere the grinding wheel, and the junction flatness should be 10 μm or less. If the flatness is inferior, the blocks 102, 103 may be deformed by the effects of the flatness of the support members 113, 115, and the straightness of the edges 109, 110, 111 may be poor. The thickness of the support member 115 is held in the second slit 108, and is equal to the gap of the second slit 108.

As shown in FIG. 18, the grinding wheel 116 used in this grinding has an arc section, and the radius of curvature is equal to the shape of the radius of curvature at the front end of the block. The radius of curvature of the arc shape is about 3 to 30 mm. By rotating the grinding wheel 116 and keeping the grinding wheel 116 in contact with the front end of the blocks 102, 103, the table on which the blocks 102, 103 are placed is fed at constant speed in the width direction to process. The other grinding conditions are properly selected.

Figure 26:
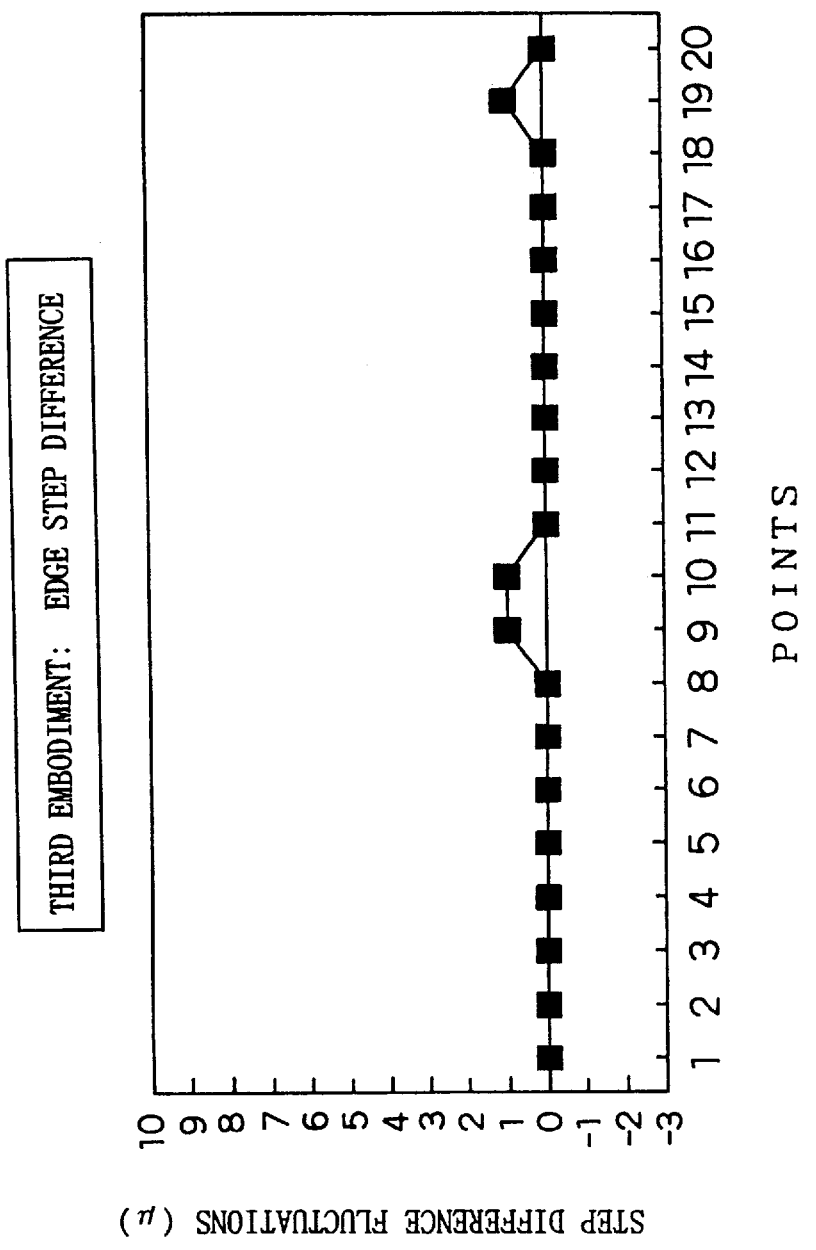
FIG. 26 is a graph showing results of measuring step difference fluctuations in the ninth embodiment of the invention.
Figure 27:
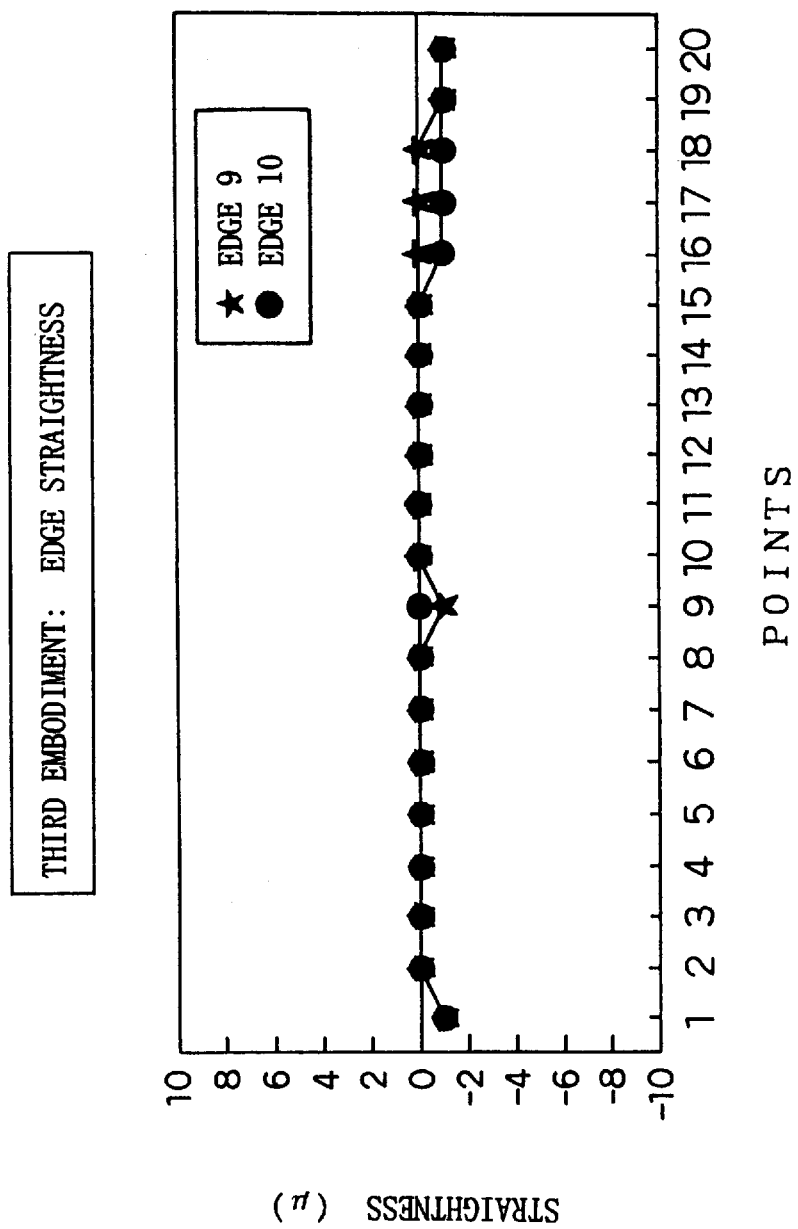
FIG. 27 is a graph showing results of measuring edge straightness in the ninth embodiment of the invention.

FIG. 26 shows results of measurement of step difference fluctuations in the block width direction between the exit side edge 110 at the front end of the second block 102 and the entry side edge 111 at the front end of the third block 103. FIG. 27 shows results of measurement of straightness in the block width direction of the edges 109, 110 at the front end of the second block 102. The measuring instrument was a three-dimensional measuring instrument of Toyo Precision, and it was measured at 10 mm pitch in the width direction.

In the processing method of the invention, the step difference fluctuations in the block width direction settle within 1 μm, and the edge straightness settles within 1 μm. As compared with the step difference fluctuations of 10 μm in the conventional processing method shown in FIG. 29, the edge step difference is evidently uniform in the invention. Also as compared with the edge straightness of 10 μm in the conventional processing method in FIG. 29, the invention evidently keeps the edge straightness uniform.

The thickness error of upper layer of the magnetic tape composed of two layers applied simultaneously by the nozzle fabricated in the processing method of nozzle in the embodiment was within 3%. As a result of similar application by the nozzle by the conventional processing method, the thickness error of upper layer was 10%, and it is evident that the nozzle fabricated by the nozzle processing method of the embodiment is excellent in the effect of suppressing the uneven thickness of coat film.

(Comparative example)

Figure 28:
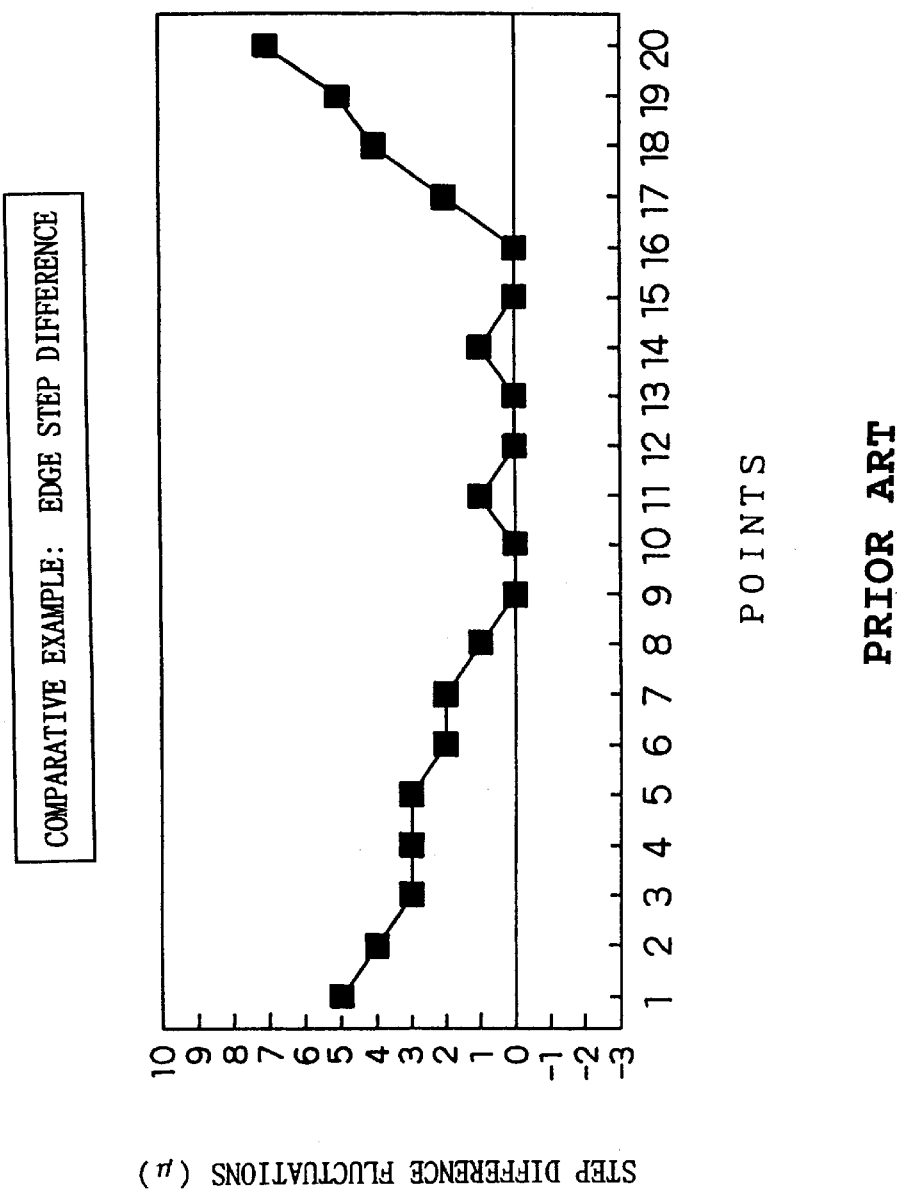
FIG. 28 is a graph showing results of measuring step difference fluctuations in the prior art.
Figure 29:
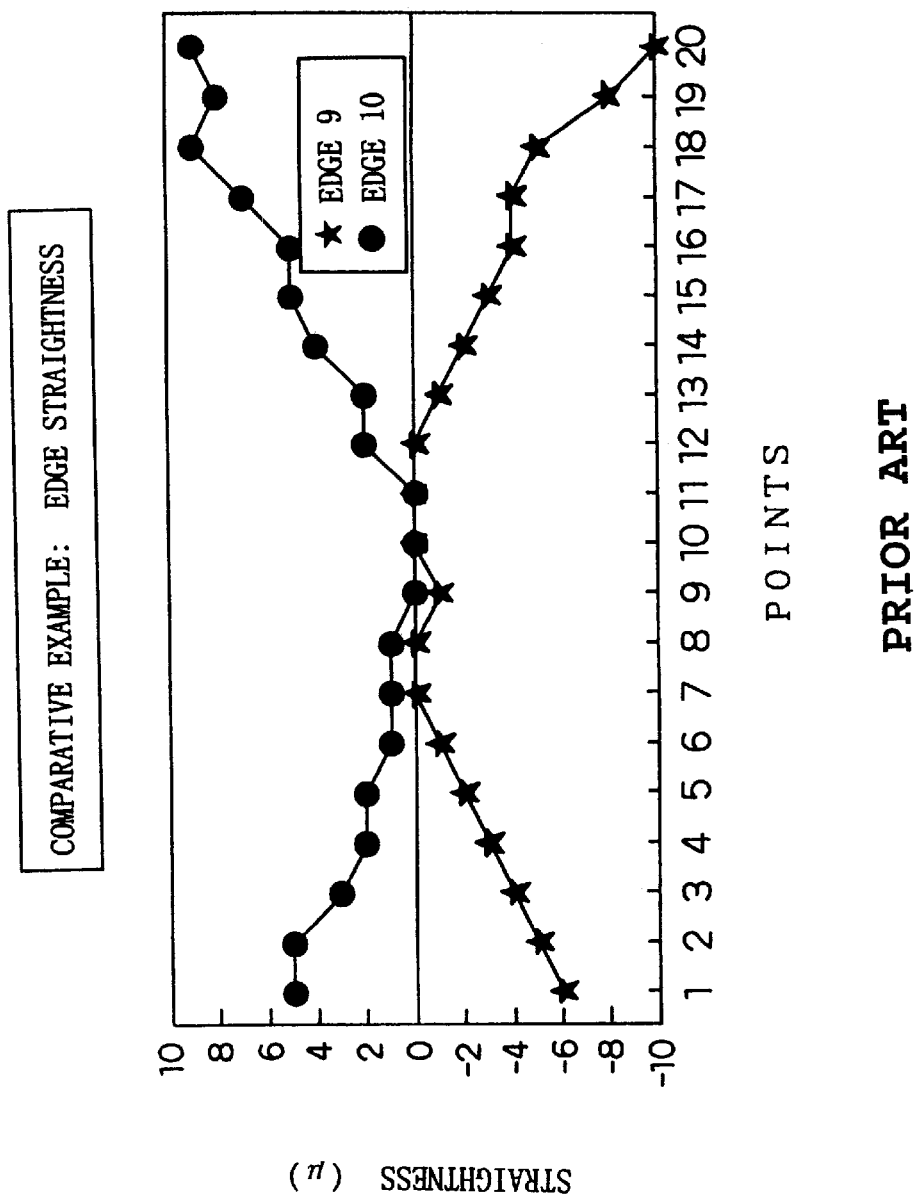
FIG. 29 is a graph showing results of measuring edge straightness in the prior art.

Grinding was processed by a conventional method. In the nozzle having two slits shown in FIG. 21, the step difference between the exit side edge 110 at the front end of the second block 102 and the entry side edge 111 at the front end of the third block 103 was measured in the block width direction, and the fluctuation was 10 μm as shown in FIG. 28. As a result of measurement of straightness of the entry side edge 109 at the front end of the second block, the straightness was 10 μm as shown in FIG. 29. The measuring instrument was a three-dimensional measuring instrument of Toyo Precision, and it was measured at 10 mm pitch in the width direction.

(Embodiment 10)

According to the processing method of nozzle of embodiment 7 or 9, as mentioned above, since the fluctuations of the step difference between the exit side edge 110 at the front end of the second block and the entry side edge 111 at the front end of the third block 103 are extremely small, within 1 μm, when two layers are applied simultaneously, the uneven thickness of the upper layer may be kept small. In this embodiment, after simultaneous grinding of the second block 102 and third block, the second block 102 and third block are deviated and assembled so that the step difference between the exit side edge 110 at the front end of the second block 102 and the entry side edge 111 at the front end of the third block 103 may be in a range of 3 to 10 μm. As a result, without causing uneven film thickness, the film thickness of the upper layer can be set uniformly and precisely. This step difference is practically proper at 5 m.

[Effects of the Invention]

As clear from the description herein, the invention can suppress formation of vertical stripes in continuous production when applying an extremely thin coat film in a single layer or double-layer structure, and can minimize fluctuations of film thickness in the width direction, and hence can produce magnetic tapes, photosensitive films, silicone coating, battery pole plates, laminate ceramic capacitors, and other electronic components at stable quality and at high yield.

The invention is also capable of chamfering a very small curvature shape precisely and smoothly at radius of curvature of 5 to 45 μm. Therefore, trapping of foreign matter in the nozzle slit exit side edge is eliminated, and application is stable for a long time, and it outstandingly enhances the productivity, product quality and yield in magnetic tapes and other coating related products.

By grinding and processing according to the processing method of nozzle of the invention, the processing precision of nozzle is substantially enhanced. As a result, uneven coat film in coating of magnetic tape and the like is suppressed, and magnetic tapes with uniform film thickness can be produced, and the product quality and yield are improved dramatically.

What is claimed is:

1. A nozzle, comprising:
   an upstream lip,
   at least one downstream lip having a curvature shape, and
   at least one slit formed at least in part by the upstream lip and the downstream lip, wherein
      a side corner portion of the downstream lip at a slit outlet is an arc or a nearly arc shape with radius of curvature of 5 to 45 μm.

2. The nozzle defined by claim 1, wherein:
   the upstream lip does not extend past a tangent line extending from the side corner portion of the downstream lip at the slit outlet.

3. The nozzle defined by claim 1, wherein:
   the radius of curvature of the downstream lip is between 3 mm and 30 mm.

4. The nozzle defined by claim 1, wherein:
   the nearly arc shape includes arc portions and plane portions.

5. A nozzle, comprising:
   at least three lips including two downstream lips and an upstream lip, and
   at least two slits formed at least in part by the three lips, wherein:
      the two downstream lips each have a curvature shape, and
      a side corner portion at a slit outlet of at least one of the two downstream lips is an arc or a nearly arc shape with radius of curvature of 5 to 45 μm.

6. The nozzle defined by claim 5, wherein:
   the arc or nearly arc shape of the side corner portion at the slit outlet of the downstream lip has essentially the same shape along a width direction.

7. A nozzle, comprising:
   at least three lips including two downstream lips and an upstream lip, and
   at least two slits formed at least in part by the three lips, wherein
      the downstream lips each have a curvature shape having an essentially coincidental center point and essentially identical radii of curvature.

8. The nozzle defined by claim 7, wherein:
   a side corner portion at the slit outlet of at least one of the two downstream lips is an arc or a nearly arc shape with radius of curvature of 5 to 45 μm.

9. The nozzle defined by claim 7, wherein:
   the upstream lip does not extend past a tangent line extending from the side corner portion at the slit outlet of at least one of the downstream lips.

10. The nozzle defined by claim 7, wherein:
    the radius of curvature of each downstream lip is between 3 mm and 30 mm.

11. The nozzle defined by claim 8, wherein:
    the arc or nearly arc shape of the side corner portion at the slit outlet of each one of the downstream lips has essentially the same shape along a width direction.

12. The nozzle defined by claim 7, wherein:
    the center point of the curvature shapes of the downstream lips is disposed within a range of about ±2 mm from the center of the middle of the slit formed by the downstream lips.

13. The nozzle defined by claim 7, wherein:
    the center point of the curvature shapes of the two downstream lips is located in the slit formed by the two downstream lips.

14. A nozzle, comprising:
    at least three lips including two downstream lips and an upstream lip, and
    at least two slits formed at least in part by the three lips, wherein
       the two downstream lips each have a curvature shape having essentially the same radius of curvature, and
       the step difference of each edge at the slit side of the two downstream lips is in a range of 3 to 10 μm.

15. The nozzle defined by claim 14, wherein:
    a side corner portion at the slit outlet of an upstream side of at least one of the two downstream lips is an arc or a nearly arc shape with radius of curvature of 5 to 45 μm.

16. A nozzle, comprising:
    an upstream lip and at least one downstream lip defining an opening, a corner portion at said opening of one of said downstream lips including an arc portion having a radius of curvature of 5 to 45 μm.

* * * * *